US009228519B2

(12) United States Patent
Hagari

(10) Patent No.: US 9,228,519 B2
(45) Date of Patent: Jan. 5, 2016

(54) ESTIMATION DEVICE FOR CYLINDER INTAKE AIR AMOUNT IN AN INTERNAL COMBUSTION ENGINE

(71) Applicant: Hideki Hagari, Chiyoda-ku (JP)

(72) Inventor: Hideki Hagari, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 477 days.

(21) Appl. No.: 13/850,747

(22) Filed: Mar. 26, 2013

(65) Prior Publication Data

US 2014/0116376 A1 May 1, 2014

(30) Foreign Application Priority Data

Oct. 25, 2012 (JP) ................................ 2012-235433

(51) Int. Cl.

*B60T 7/12* (2006.01)
*F02D 41/18* (2006.01)
*F02D 41/24* (2006.01)
*F02D 11/10* (2006.01)
*F02D 41/00* (2006.01)
*F02D 41/14* (2006.01)

(52) U.S. Cl.

CPC .......... *F02D 41/182* (2013.01); *F02D 41/2451* (2013.01); *F02D 11/106* (2013.01); *F02D 2041/001* (2013.01); *F02D 2041/1434* (2013.01); *F02D 2200/0402* (2013.01); *F02D 2200/0404* (2013.01); *F02D 2200/0411* (2013.01); *F02D 2200/0414* (2013.01)

(58) Field of Classification Search

CPC ........... F02D 35/0023; F02D 35/0046; F02D 35/023; F02D 35/025

USPC .......... 701/103; 123/434, 435, 673, 674, 690; 73/114.32, 114.36, 114.37

See application file for complete search history.

(56) References Cited

U.S. PATENT DOCUMENTS 6,279,551 B1 * 8/2001 Iwano ..................... F02B 37/18 123/564
2005/0066937 A1 * 3/2005 Toyoshima ........... F02D 11/105 123/339.25
2007/0293956 A1 * 12/2007 Yasui .................. F01L 13/0021 700/29
2008/0115762 A1 * 5/2008 Hiraku .................... F02D 13/08 123/339.14
2011/0126812 A1 * 6/2011 Miyashita ............. F01N 13/107 123/703

(Continued)

FOREIGN PATENT DOCUMENTS

JP 08-303293 A 11/1996
JP 2008-057339 A 3/2008

*Primary Examiner* — John Kwon
(74) *Attorney, Agent, or Firm* — Sughrue Mion, PLLC; Richard C. Turner

(57) ABSTRACT

An estimation device for a cylinder intake air amount in an internal combustion engine can estimate a cylinder intake air amount to a sufficient accuracy for suitable engine control, in either of steady state operation and transient operation with a small number of adaptation constants and a small amount of calculation load, without requiring a huge memory capacity. The relation between an opening degree and an effective opening area of a throttle valve has been learned, while calculating the cylinder intake air amount in an S/D method from a volumetric efficiency correction factor map adapted by valve timing at the time of steady state operation, and in a period from a transient change until an exhaust manifold temperature is converged, an intake air amount is calculated based on the relation thus learned. The cylinder intake air amount is calculated based on a physical model of an intake system response delay.

11 Claims, 9 Drawing Sheets

(56) References Cited

U.S. PATENT DOCUMENTS

2013/0032101 A1* 2/2013 Takeuchi ................ F01P 7/164
123/41.02
2015/0113983 A1* 4/2015 Yokono ................... F02B 37/18
60/605.1
2015/0240731 A1* 8/2015 Yokono ............... F02D 41/0007
60/611

* cited by examiner

209: THROTTLE OPENING DEGREE LEARNING VALUE CALCULATION PART

ESTIMATION DEVICE FOR CYLINDER INTAKE AIR AMOUNT IN AN INTERNAL COMBUSTION ENGINE

BACKGROUND OF THE INVENTION

1. Field of the Invention

The present invention relates to a control device for an internal combustion engine which is provided with a VVT (variable valve timing drive) mechanism, and more specifically, to an estimation device for a cylinder intake air amount in an internal combustion engine, which serves for calculating an amount of intake air sucked in a cylinder with a high degree of accuracy.

2. Description of the Related Art

In general, in order to control an engine in a suitable manner, it is important to calculate an amount of air to be sucked into a cylinder (hereinafter also referred to as a cylinder intake air amount) with a high degree of accuracy, and to carry out fuel control and ignition timing control according to the amount of air which has been sucked into the cylinder.

In order to obtain a cylinder intake air amount, there are generally applied two kinds of methods including an AFS method of measuring the cylinder intake air amount by the use of an air flow sensor (AFS: Air Flow Sensor) which is arranged in an intake pipe at a location upstream of a throttle valve, and an S/D method (Speed Density method) of calculating by estimation the cylinder intake air amount from an intake manifold pressure and an engine rotational speed by using a pressure sensor (hereinafter referred to as an "intake manifold pressure sensor") which is arranged in an intake manifold system (a surge tank and an intake manifold) downstream of the throttle valve in the intake pipe, and an engine rotation sensor.

In addition, there have also been known a technique which serves to switch between the individual methods according to an operating state of an internal combustion engine by using the above-mentioned sensors in combination with each other, and a technique which serves to measure an intake manifold pressure, even in the case of an AFS method.

In recent years, for the purpose of further reducing fuel consumption as well as further increasing output power, there is made popular an adoption of a VVT (Variable Valve Timing) mechanism (hereinafter referred to as an "intake VVT") which serves to make variable the valve opening and closing timing of each intake valve. Moreover, VVT mechanisms are also becoming increasingly adopted for exhaust valves, too, in addition to intake valves (hereinafter referred to as an intake and exhaust VVT system).

In an engine provided with such an intake and exhaust VVT system, however, an amount of intake air sucked into a cylinder from an intake manifold changes greatly depending on the valve opening and closing timing of the intake and exhaust valves, as a result of which if the influence of the valve opening and closing timing is not taken into consideration, in particular in the S/D method, the calculation accuracy of the amount of intake air sucked into the cylinder will decrease to a large extent in all the operation regions including a steady state operation region and a transient operation region.

In addition, in cases where the valve timing is caused to change, a response delay will occur, so that at the time of transient operation, valve timing does not match that which has been set at the time of steady state operation, thus resulting in a cause that will reduce the calculation accuracy of the amount of air to a substantial extent.

In the past, as an estimation method for a cylinder intake air amount in the S/D method, there has been known a method of calculating a cylinder intake air amount from an intake manifold pressure, a volumetric efficiency, a cylinder volume, and a temperature, by assuming as a premise that engine parameters such as valve timing, etc., do not change (for example, refer to a first patent document).

In the method of the first patent document, in cases where a variable valve is applied to the S/D method, it can be considered that a volumetric efficiency in the steady state operation, in which valve timing is in coincidence with one in a control map of valve timing, is set to a map value. In this case, however, there will be no problem at the time of steady state operation, but at the time of transient operation, the calculation accuracy of the amount of air will reduce to a substantial extent.

Accordingly, in order to suppress the reduction in the calculation accuracy of the amount of air at the time of transient operation, it is also considered that many maps for volumetric efficiency have been set according to valve timing, but in the case of applying such a scheme to an intake and exhaust VVT system, it is necessary to set maps of volumetric efficiency according to valve timing of each of an intake VVT mechanism and an exhaust VVT mechanism. As a result, a large number of man hours are required in adaptation and data setting, and moreover, the capacity of memory required for a microcomputer in an ECU becomes huge.

For example, according to the method of the first patent document, as for the number of maps for volumetric efficiency corresponding values (indexes each of which indicates an amount of air coming into a cylinder from an intake manifold), in cases where the operating range of a VVT mechanism is represented by six representative points, with each region between adjacent points (hereinafter referred to as an interpoint region) being interpolated, six volumetric efficiency corresponding value maps are required for a system configuration using only an intake VVT mechanism, and a total number (6×6=36) of volumetric efficiency corresponding value maps will be required for a system configuration of an intake and exhaust VVT system.

That is, in an engine having VVT mechanisms, in cases where an S/D method of estimating a cylinder intake air amount from an intake manifold pressure and an engine rotational speed is applied, it is necessary to adapt the volumetric efficiency corresponding value according to the actual valve timing of each VVT mechanism, and hence the number of storage maps becomes huge.

PRIOR ART REFERENCES

Patent Documents

First Patent Document: Japanese patent application laid-open No. H08-303293

SUMMARY OF THE INVENTION

The conventional cylinder intake air amount estimation device for an internal combustion engine has had a problem that when a volumetric efficiency map in a steady state is set in cases where variable drive valves are applied to the S/D method, the calculation accuracy at the time of transient operation will reduce to a substantial extent.

In addition, there has also been another problem that in cases where many volumetric efficiency maps are set so as to suppress the reduction in the calculation accuracy at the time of transient operation, it is necessary to set a large number of maps according to individual valve timing, thus requiring a huge memory capacity.

Accordingly, as described in a Japanese patent application (Japanese patent application No. 2012-61824) filed by the same applicant as in this application, it is also considered that in order to calculate a cylinder intake air amount with a high degree of accuracy by the use of a small number of maps in an engine which is provided with an intake and exhaust VVT system, in the AFS method, the cylinder intake air amount is estimated by using a physical model which models a response delay in an intake system until the air having passed through a throttle valve comes into a cylinder, whereas in the S/D method, such an estimation is carried out by using a physical model which models the motion of air which comes into a cylinder from an intake manifold.

In this case, a volumetric efficiency corresponding value is used which is an index indicating an amount of air coming into the cylinder from the intake manifold, but the volumetric efficiency corresponding value (i.e., a volumetric efficiency correction factor) can be calculated by the use of two internal variables (i.e., an intake efficiency and an exhaust efficiency). In addition, it is also possible to estimate an internal EGR rate (a proportion of exhaust gas which has remained in the cylinder) by the use of the exhaust efficiency.

By carrying out approximate operation or calculation of the internal variables by the use of the above-mentioned physical model, it becomes possible to reduce the number of necessary maps to a substantial extent, in comparison with the case of the first patent document in which the number of maps for volumetric efficiency corresponding values is required to be six in the intake VVT system, and thirty six in the intake and exhaust VVT system.

However, in cases where linear (first-order) approximate expressions are used for calculation of the internal variables, the number of necessary maps can be reduced to a large extent, but in cases where quadratic (second-order) approximate expressions or cubic (third-order) approximate expressions are used for the purpose of further accuracy improvement, the number of necessary maps will increase as well, thus resulting in the fact that the effect of reducing the number of maps will be decreased.

Moreover, in order to obtain the approximate expressions for the calculation of the internal variables, in the case of the intake and exhaust VVT system, data measurements for 6×6 (=36) pieces of volumetric efficiency correction factor maps are eventually required, and hence, there is a problem that the effect of reducing adaptation man hours can not be expected. Further, the volumetric efficiency correction factor also has a problem that it is easy to cause errors resulting from environmental conditions or individual variations, and these errors can not be absorbed.

In addition, in the case of the S/D method, there is a problem that an accurate cylinder intake air amount can not be estimated at the time of transient operation as well as in a predetermined period of time after the transient operation.

In general, in cases where a map for the volumetric efficiency correction factor is adapted, map values are calculated by using the relation among an intake manifold pressure, an intake manifold temperature, and a cylinder intake air amount (e.g., calculated from an AFS and an amount of fuel injection) at the time when a throttle is swept in the steady state operation (or at a slow rate of change which is near that in the steady state operation).

Moreover, the volumetric efficiency correction factor is considered to be that the relation of the intake manifold pressure, the intake manifold temperature and the cylinder intake air amount, in a state where the relationship among the cylinder intake air amount, the pressure and temperature in the intake manifold, and the pressure and temperature in an exhaust pipe from an exhaust valve to a catalyst (hereinafter referred to as an "exhaust manifold") is in a balanced state, is derived as a pure number.

Further, it is experientially known that the above-mentioned balanced state is substantially maintained also in cases where it has returned to the point set in which it is once the same again after the state changed to another point of operation Accordingly, it is considered that in the S/D method, assuming, by the use of this property, that the relation among the intake manifold pressure, the intake manifold temperature, the cylinder intake air amount and the volumetric efficiency correction factor is always constant, the cylinder intake air amount is estimated from the intake manifold pressure, the intake manifold temperature and the volumetric efficiency correction factor.

However, in cases where the engine operation has transitionally changed from low load operation to high load operation, or in cases where the engine operation has changed vice versa, in particular, a temperature change in the exhaust manifold will be large (e.g., about 400 degrees C.-800 degrees C.), and a certain amount of time (e.g., about several seconds-30 seconds) will be required before the temperature in the exhaust manifold is converged. In this case, the relation of the intake manifold pressure, the intake manifold temperature and the cylinder intake air amount will shift or change in a period of time from the time of a transient change until the temperature in the exhaust manifold is converged.

In other words, it is known that in the case of the S/D method, the cylinder intake air amount can not be calculated with a high degree of accuracy until the temperature in the exhaust manifold is converged, even if a physical model is used.

It is considered that the cause of this is in the amount of internal EGR which changes resulting from the fact that the temperature in the exhaust manifold differs or varies. Accordingly, at the time of transient operation as well as in the predetermined period of time thereafter, the temperature in the exhaust manifold differs or varies, and hence, the amount of internal EGR changes, thus making it impossible to estimate an accurate cylinder intake air amount.

Here, note that in the case of the AFS method, an estimation error of the cylinder intake air amount as in the S/D method does not occur, even in the period of time from the time of the transient change until the temperature in the exhaust manifold is converged.

Accordingly, it is also considered that the estimation technique using the above-mentioned physical model is further improved, so that the estimation accuracy of the exhaust gas temperature can be improved, thereby correcting the amount of internal EGR, but in this case, there will arise the following problems. That is, the number of necessary maps further increases, and hence, it is impossible to achieve the effect of reducing the number of maps, which is an intended purpose, and besides, it is necessary to change the temperature of the exhaust gas for adaptation, and man hours for the adaptation become huge.

The present invention has been made in order to solve the problems as referred to above, and has for its object to obtain an estimation device for a cylinder intake air amount in an internal combustion engine, which, even in the case of using an S/D method, is capable of estimating a cylinder intake air amount to a sufficient degree of accuracy for controlling an engine in a suitable manner, in either of steady state operation and transient operation with a small number of adaptation constants and a small amount of calculation or computation load, without requiring a huge memory capacity.

According to the present invention, there is provided an estimation device for a cylinder intake air amount in an internal combustion engine which serves for estimating an amount of intake air sucked into a cylinder in the internal combustion engine connected to an intake pipe at a location downstream of a throttle valve, and which is provided with: a variety of kinds of sensors that detect an operating state of the internal combustion engine related to a variety of kinds of actuators; and a physical model that models a response delay of an intake system until the air having passed through the throttle valve comes into the cylinder, by using detected values of the variety of kinds of sensors as input information. The variety of kinds of actuators include a throttle opening degree control unit that regulates an amount of air passing through the throttle valve by controlling a throttle opening degree of the throttle valve thereby to change an effective opening area thereof. The variety of kinds of sensors include an atmospheric air temperature sensor that detects an atmospheric air temperature at the atmospheric air side of the throttle valve, an atmospheric air pressure sensor that detects an atmospheric air pressure at the atmospheric air side of the throttle valve, and an intake manifold pressure sensor that detects a pressure in the intake pipe at the downstream side of the throttle valve as an intake manifold pressure. The physical model includes a volumetric efficiency corresponding value calculation unit that calculates a volumetric efficiency corresponding value which is an index indicating an amount of air sucked into the cylinder, a throttle opening degree learning unit that calculates a learning corrected target throttle opening degree for achieving a target amount of intake air by learning a relation between the throttle opening degree and the effective opening area, and a cylinder intake air amount calculation unit that calculates an actual cylinder intake air amount. At the time of steady state operation, an estimation of the actual cylinder intake air amount by the cylinder intake air amount calculation unit is carried out by using the intake manifold pressure and the volumetric efficiency corresponding value, and at the same time, opening degree learning by the throttle opening degree learning unit is carried out based on the actual cylinder intake air amount, whereas at the time of transient operation, after the opening degree learning by the throttle opening degree learning unit is stopped, an amount of intake air having passed through the throttle valve is estimated by applying the actual effective opening area calculated from the throttle opening degree and a result of the opening degree learning, the intake manifold pressure, the atmospheric air pressure and the atmospheric air temperature to a flow rate calculation expression of a throttle type flow meter, and at the same time, the calculation of the actual cylinder intake air amount by the cylinder intake air amount calculation unit is carried out based on the amount of intake air.

According to the present invention, in cases where the cylinder intake air amount is calculated by the use of an S/D method, at the time of steady state operation, the relation between the throttle opening degree and the effective opening area is learned, while calculating the cylinder intake air amount from a volumetric efficiency correction factor map which has been adapted by the valve timing at the time of steady state operation, whereas in a period of time from a time point of a transient change until the temperature in an exhaust manifold is converged, the amount of intake air having passed through the throttle is calculated by the use of the relation between the throttle opening degree and the effective opening area thus learned, and the cylinder intake air amount is calculated by using the same physical model (an arithmetic system which models a response delay of the intake system until the air having passed through the throttle valve comes into a cylinder) as that in an AFS method, whereby it is possible to estimate the cylinder intake air amount to a sufficient degree of accuracy for controlling an engine in a suitable manner, in either of a steady state operation and a transient operation with a small number of adaptation constants and a small amount of calculation or computation load, without requiring a huge memory capacity.

The above and other objects, features and advantages of the present invention will become more readily apparent to those skilled in the art from the following detailed description of a preferred embodiment of the present invention taken in conjunction with the accompanying drawings.

BEST MODE FOR CARRYING OUT THE INVENTION

First Embodiment

Hereinafter, a first embodiment of the present invention will be explained in detail while referring to the accompanying drawings.

Figure 1:
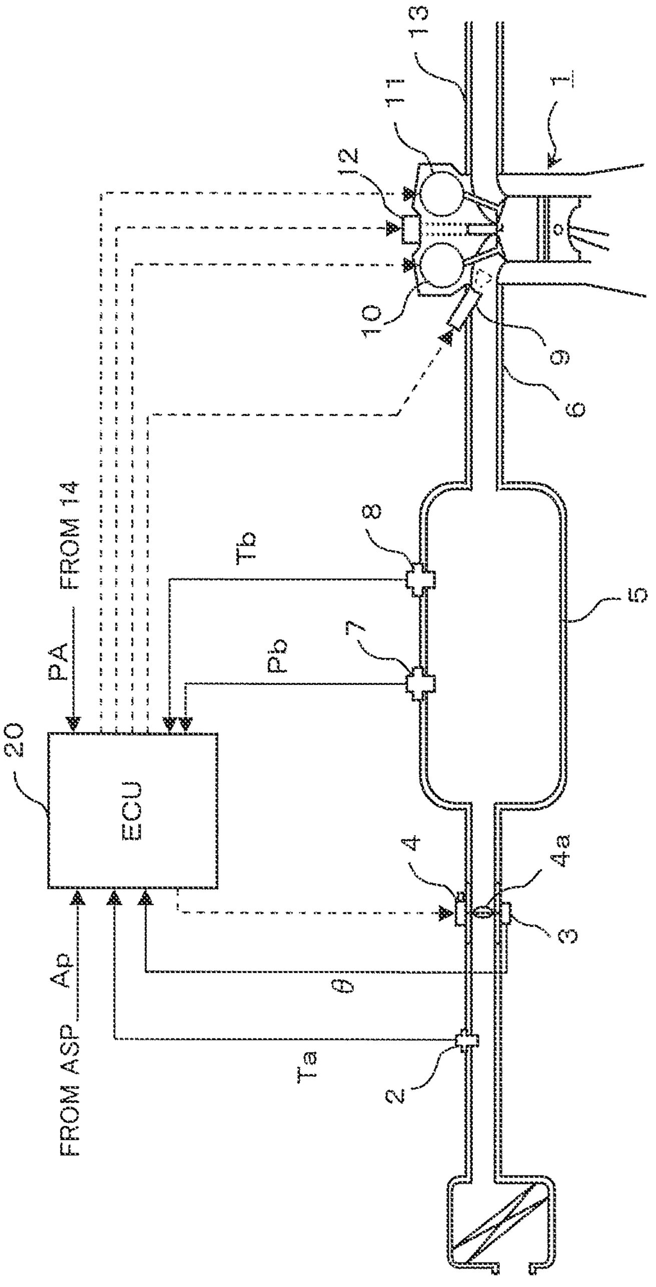
FIG. 1 is a block construction view showing an estimation device for a cylinder intake air amount in an internal combustion engine according to a first embodiment of the present invention, together with an engine.
Figure 2:
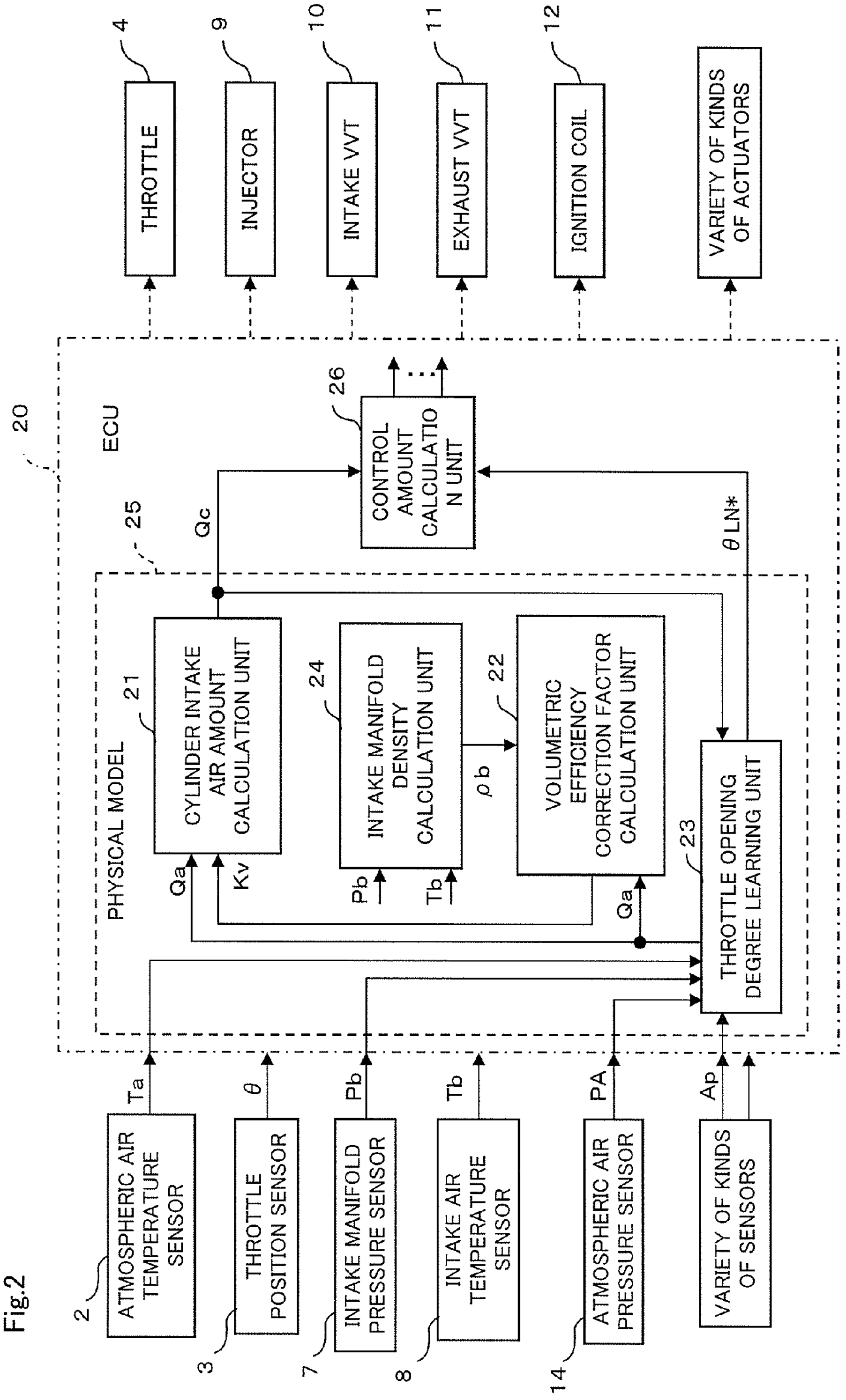
FIG. 2 is a block diagram showing a functional construction of the estimation device for a cylinder intake air amount in an internal combustion engine according to the first embodiment of the present invention, together with a variety of kinds of sensors.

FIG. 1 is a block construction view showing an estimation device for a cylinder intake air amount in an internal combustion engine according to a first embodiment of the present invention, together with an engine 1. In addition, FIG. 2 is a block diagram showing a functional construction of the estimation device for a cylinder intake air amount in an internal combustion engine according to the first embodiment of the present invention, together with a variety of kinds of sensors and a variety of kinds of actuators.

In FIG. 1, the estimation device for a cylinder intake air amount in an internal combustion engine is composed of a variety of kinds of sensors and a variety of kinds of actuators which are related to the engine 1, and an electronic control unit 20 which is connected to the variety of kinds of sensors.

Hereinafter, the electronic control unit 20 is simply referred to as the ECU 20 (Electronic Control Unit).

The ECU 20 constitutes an engine control device, together with the variety of kinds of sensors and the variety of kinds of actuators, and serves to control the variety of kinds of actuators in accordance with various pieces of detection information from the variety of kinds of sensors, which indicate an operating state of the engine 1.

In an intake system of the engine 1, an atmospheric air temperature sensor 2 for measuring an atmospheric air temperature Ta is arranged at an upstream side thereof, and an electronic control throttle 4 (hereinafter referred to simply as "a throttle 4") is arranged at a downstream side thereof (at the side of the engine 1).

The throttle 4 is composed of a throttle valve 4*a* for regulating an amount of intake air Qa, and a throttle actuator for controlling a degree of opening θ (throttle opening degree) of the throttle valve 4*a* in an electronic manner. In addition, a throttle position sensor 3 for measuring the throttle opening degree θ of the throttle valve 4*a* is mounted on the throttle 4.

At the downstream side of the throttle 4, there are arranged a surge tank 5 and an intake manifold 6 which serve as an intake pipe (an intake manifold part) for introducing air into the engine 1.

The intake manifold 6, which constitutes a part of the intake pipe, is in communication with a combustion chamber in each of cylinders of the engine 1 through an intake valve.

On the other hand, at the downstream side of the engine 1, there is arranged an exhaust manifold 13 which serves as an exhaust pipe for discharging an exhaust gas which has resulted from the combustion of an air fuel mixture in each cylinder.

The exhaust manifold 13 is in communication with the combustion chamber in each cylinder of the engine 1 through an exhaust valve. In addition, though not illustrated, in the exhaust manifold 13, there are provided an O2 (oxygen) sensor for controlling the air fuel ratio of the mixture, and a catalyst for purifying the exhaust gas.

In the intake pipe at a location downstream of the throttle 4, there are arranged an intake manifold pressure sensor 7 that serves to measure a pressure (i.e., an intake manifold pressure Pb) in an intake manifold space including the interiors of the surge tank 5 and the intake manifold 6, and an intake air temperature sensor 8 that serves to measure a temperature (i.e., an intake manifold temperature Tb) in the intake manifold space.

In addition, though not specifically illustrated here, an atmospheric air pressure sensor 14 and an accelerator opening sensor APS are connected to the ECU 20, so that, in addition to the above-mentioned information on the variety of kinds of sensors, an atmospheric air pressure PA from the atmospheric air pressure sensor 14 and an accelerator opening degree Ap from the accelerator opening sensor APS are inputted to the ECU 20.

Here, note that in place of the intake manifold pressure sensor 7 for measuring the intake manifold pressure Pb, there may also be provided a unit for estimating the intake manifold pressure from the operating state of the engine 1, the atmospheric air pressure, and so on.

In addition, in place of the intake air temperature sensor 8 for measuring the intake manifold temperature Tb, the intake manifold temperature Tb may also be estimated from a measured value of the atmospheric air temperature sensor 2, though which is strictly different from the intake manifold temperature Tb. On the contrary, the atmospheric air temperature Ta may also be estimated from the measured value of the intake air temperature sensor 8, in place of the atmospheric air temperature sensor 2.

Moreover, in place of the atmospheric air pressure sensor 14 for measuring the atmospheric air pressure PA, another atmospheric air pressure estimating unit may also be used, or an atmospheric air pressure sensor built in the ECU 20 may also be used.

An injector 9 for injecting fuel is arranged in the intake manifold 6 in the vicinity of an intake valve, and an intake VVT 10 and an exhaust VVT 11, which serve to make the valve timing of the intake and exhaust valves variable, are attached to the intake valve and the exhaust valve, respectively.

In addition, an ignition coil 12 for driving a spark plug to generate a spark inside a cylinder is arranged in a cylinder head.

In FIG. 2, the ECU 20 is provided with a physical model 25 of the intake system that serves to calculate an actual cylinder intake air amount Qc and a learning corrected target throttle opening degree θLN*, and a control amount calculation unit 26 that serves to drive the variety of kinds of actuators according to the cylinder intake air amount Qc and the learning corrected target throttle opening degree θLN*.

The physical model 25 is composed of a cylinder intake air amount calculation unit 21 that calculates the actual cylinder intake air amount Qc, a volumetric efficiency correction factor calculation unit (or a volumetric efficiency corresponding value calculation unit) 22 that calculates a volumetric efficiency correction factor (or a volumetric efficiency corresponding value) Kv, a throttle opening degree learning unit 23 that generates the amount of intake air Qa and the learning corrected target throttle opening degree θLN*, and an intake manifold density calculation unit 24 that calculates an intake manifold density ρb.

Measurement information from (the atmospheric air temperature Ta, the throttle opening degree θ, the intake manifold pressure Pb, the intake manifold temperature Tb, the atmospheric air pressure PA and the accelerator opening degree Ap) from the above-mentioned variety of kinds of sensors 2, 3, 7, 8, 14 and the APS are inputted to the ECU 20.

Here, note that, though not illustrated, a variety of kinds of measured values from other sensors and engine rotation information from a crank angle sensor are inputted to the ECU 20.

In addition, although details will be described later, in the physical model 25 in the ECU 20, the throttle opening degree learning unit 23 calculates the learning corrected target throttle opening degree θLN* for finally driving the throttle 4 by using at least the cylinder intake air amount Qc, the atmospheric air temperature Ta, the intake manifold pressure Pb, the atmospheric air pressure PA, and the accelerator opening degree Ap.

Further, the throttle opening degree learning unit 23 is to calculate the amount of intake air Qa used for the arithmetic operations of the cylinder intake air amount calculation unit 21 and the volumetric efficiency correction factor calculation unit 22.

Here, note that, in FIG. 2, there is shown an arrangement example in the case where the throttle opening degree learning unit 23 calculates the amount of intake air Qa, but the amount of intake air Qa may be calculated by means of any arbitrary unit in the ECU 20.

The intake manifold density calculation unit 24 calculates the intake manifold density ρb (density of fresh air in the intake manifold) with the use of the intake manifold pressure Pb measured by the intake manifold pressure sensor 7, and the intake manifold temperature Tb measured by the intake air temperature sensor 8.

In addition, the volumetric efficiency correction factor calculation unit 22 calculates the volumetric efficiency correction factor Kv by using the amount of intake air Qa calculated by the throttle opening degree learning unit 23, and the intake manifold density ρb calculated by the intake manifold density calculation unit 24.

The cylinder intake air amount calculation unit 21 calculates an actual cylinder intake air amount Qc in the engine 1 by the use of the amount of intake air Qa calculated by the throttle opening degree learning unit 23, and the volumetric efficiency correction factor Kv calculated by the volumetric efficiency correction factor calculation unit 22.

Here, note that at the time of steady state operation, the cylinder intake air amount calculation unit 21 calculates the cylinder intake air amount Qc by the use of a general S/D method, whereas at the time of transient operation, it calculates the cylinder intake air amount Qc by the use of the amount of intake air Qa (the learning result of the amount of air having passed through the throttle 4 at the time of steady state operation) calculated by the throttle opening degree learning unit 23, and the volumetric efficiency correction factor Kv.

The control amount calculation unit 26 in the ECU 20 carries out fuel control, ignition timing control and intake air amount control, by driving the injector 9, the ignition coil 12 and the throttle 4 in accordance with the cylinder intake air amount Qc calculated by the cylinder intake air amount calculation unit 21, and the learning corrected target throttle opening degree θLN* subjected to integration processing by the throttle opening degree learning unit 23.

In addition, although details will be described later, with respect to the intake air amount control, the throttle opening degree learning unit 23 calculates a target torque of the engine 1 according to the various kinds of sensor information including the accelerator opening degree Ap, calculates a target cylinder intake air amount for achieving the target torque, and calculates a target amount of intake air Qa* passing through the throttle 4 based on the target cylinder intake air amount.

In addition, the throttle opening degree learning unit 23 calculates, as control target values for achieving the target amount of intake air Qa*, a target throttle opening degree θ* and the learning corrected target throttle opening degree θLN*, and further calculates a target intake VVT phase angle and a target exhaust VVT phase angle.

According to this, the control amount calculation unit 26 controls the throttle opening degree θ of the throttle 4 and the phase angles of the intake VVT 10 and the exhaust VVT 11, so as to achieve the individual control target values.

Further, the control amount calculation unit 26 also controls other various kinds of actuators (an EGR valve, etc.) which are not illustrated, as needed.

Here, note that the opening degree learning (based on the relation between the effective opening area CAt and the throttle opening degree θ) by the throttle opening degree learning unit 23 is described in well-known literatures (e.g., Japanese patent application laid-open No. 2008-57339), and so the details thereof will be omitted here.

Next, reference will be made in detail to the calculation processing of the cylinder intake air amount Qc by the cylinder intake air amount calculation unit 21 in the physical model 25, while referring to FIG. 1 and FIG. 2.

First of all, an intake pipe volume Vs [$cm^3$] extending from a downstream end of the throttle 4 to each cylinder inlet port of the engine 1 and a cylinder stroke volume Vc [$cm^3$] per 1 cylinder are defined.

In addition, with respect to the number of strokes n of the engine 1, an average value Qa(n) of the amount of intake air Qa [g/s] having passed through the throttle 4 for one stroke of the engine 1, an average value Qc(n) of the cylinder intake air amount Qc [g/s] for one stroke of the engine 1, a period of time T(n) [s] for one stroke of the engine 1 (i.e., 180 deg. CA in a 4-cylinder engine, and 240 deg. CA in a 3-cylinder engine), an average value ρb(n) of the intake manifold density ρb [$g/cm^3$] for one stroke, and a volumetric efficiency correction factor Kv(n) of the air which comes into a cylinder from the intake manifold are defined, respectively.

Further, the actual amount of intake air Qa(n)T(n) [g/stroke] and the actual cylinder intake air amount Qc(n)T(n) [g/stroke] per stroke (cycle) of the engine 1 are defined, respectively.

Here, note that the actual amount of intake air Qa(n)T(n) and the actual cylinder intake air amount Qc(n)T(n) correspond to the amount of intake air Qa and the cylinder intake air amount Qc, respectively, and hence, in the following, they are also referred to simply as the amount of intake air Qa(n)T(n) and the cylinder intake air amount Qc(n)T(n), respectively.

Here, when the relation between a difference of the actual amount of intake air Qa(n)T(n) and the actual cylinder intake air amount Qc(n)T(n), and an amount of change of the intake manifold density ρb(n) (average value) is represented by focusing attention only on fresh air (the air which comes into the intake manifold by way of the throttle 4) in a region indicated by the intake pipe volume Vs, the following expression (1) will be satisfied by applying the law of conservation of mass for one stroke.

[Expression 1]

$$Qa(n)T(n)-QC(n)T(n)=\{\rho_b(n)-\rho_b(n-1)\}\cdot Vs \quad (1)$$

However, in the expression (1), ρb(n−1) is an intake manifold density in one stroke before stroke n, and ρb(n)−ρb(n−1) corresponds to an amount of change Δρb of the intake manifold density.

On the other hand, the actual cylinder intake air amount Qc(n)T(n) for one stroke is represented as shown in the following expression (2), by using the intake manifold density ρb(n), the cylinder stroke volume Vc, and the volumetric efficiency correction factor Kv(n).

[Expression 2]

$$Qc(n)T(n)=Kv(n)\cdot\rho_b(n)\cdot Vc \quad (2)$$

Here, note that when the engine 1 is in a steady state operation, the actual amount of intake air Qa(n)T(n) and the actual cylinder intake air amount Qc(n)T(n) become equal to each other, so it is possible to calculate the volumetric efficiency correction factor Kv by the use of an expression in which the left hand side of the expression (2) is replaced with the actual amount of intake air Qa(n)T(n), at the time of adaptation of engine control constants.

Subsequently, by assigning the expression (2) to the expression (1), the intake manifold density ρb(n) is eliminated, and solving the expression (1) for the actual cylinder intake air amount Qc(n)T(n), the actual cylinder intake air amount Qc(n)T(n) is represented by the use of a filter constant K, as shown in the following expression (3).

[Expression 3]

$$Qc(n)T(n) = \frac{Kv(n)}{Kv(n-1)} \cdot K \cdot Qc(n-1)T(n-1) + (1-K) \cdot Qa(n)T(n) \because K = \frac{Vs}{Vs + Kv(n) \cdot Vc} \quad (3)$$

The expression (3) corresponds to the physical model 25 of the intake system, and by using the expression (3), it is possible to calculate the actual cylinder intake air amount Qc(n)T(n) from the actual amount of intake air Qa(n)T(n) having passed through the throttle 4, with a high degree of accuracy. In addition, from the actual cylinder intake air amount Qc(n)T(n), a charging efficiency in the cylinder can be calculated with a high degree of accuracy, so that it can be used for various kinds of engine control.

By further transforming the expression (3), the following expressions (4) will be obtained.

[Expression 4]

$$\frac{Qc(n)T(n)}{Kv(n)} = K \cdot \frac{Qc(n-1)T(n-1)}{Kv(n-1)} \cdot +(1-K) \cdot \frac{Qa(n)T(n)}{Kv(n)} \quad (4)$$

The expression (4) means a digital low pass filter in interrupt processing which is in synchronization with the rotation of the engine 1 (e.g., every prescribed crank angle). Accordingly, it will be understood that the intake system of the engine 1 is a first order lag element.

In addition, the expression (3) is to calculate the cylinder intake air amount Qc from the amount of intake air Qa having passed through the throttle 4, so in the case of the AFS method, it is possible to calculate the cylinder intake air amount Qc by using the expression (3).

On the other hand, in the case of the S/D method, the cylinder intake air amount Qc can be calculated by directly using the expression (2), needless to use the expression (3).

In cases where the expression (2) is used in the S/D method, however, the amount of intake air Qa having passed through the throttle 4 is unknown.

However, the throttle opening degree learning unit 23 needs to learn the relation between the effective opening area CAt and the throttle opening degree 8 based on the amount of intake air Qa having passed through the throttle 4, and so in the S/D method, too, it is desirable to calculate the amount of intake air Qa having passed through the throttle 4.

Accordingly, by solving the expression (3) for the amount of intake air Qa(n)T(n), the throttle opening degree learning unit 23 calculates the amount of intake air Qa(n)T(n) having passed through the throttle 4 by the use of the cylinder intake air amount Qc(n)T(n), the volumetric efficiency correction factor Kv(n) and the filter constant K, as shown in the following expression (5).

[Expression 5]

$$Qa(n)T(n) = \frac{Qc(n)T(n) - \frac{Kv(n)}{Kv(n-1)} \cdot K \cdot Qc(n-1)T(n-1)}{1-K} \quad (5)$$

By using the expression (5), in the S/D method, too, it becomes possible to calculate the amount of intake air Qa having passed through the throttle 4.

Next, the calculation processing by the volumetric efficiency correction factor calculation unit 22 will be explained in detail.

First, the expression (3) obtained from the expression (1) and the expression (2) is one for calculating the cylinder intake air amount Qc(n)T(n) from the amount of intake air Qa(n)T(n) having passed through the throttle 4.

Here, when the cylinder intake air amount Qc(n)T(n) is eliminated by assigning the expression (2) for the expression (1), the volumetric efficiency correction factor Kv(n) is represented by the following expression (6) using the amount of intake air Qa(n)T(n), the amount of change Δρb of the intake manifold density, the intake pipe volume Vs, the intake manifold density ρb(n), and the cylinder stroke volume Vc.

[Expression 6]

$$Kv(n) = \frac{Qa(n)T(n) - \{\rho_b(n) - \rho_b(n-1)\} \cdot Vs}{\rho_b(n) \cdot Vc} \quad (6)$$

The intake manifold density ρb(n) [g/cm$^3$] in the expression (5) can be calculated by means of an equation of state comprising the following expression (7), using the intake manifold pressure Pb(n) [kPa] measured by the intake manifold pressure sensor 7, the intake manifold temperature Tb(n) [° K] measured by the intake air temperature sensor 8, and a gas constant R [kJ/(kg·K)].

[Expression 7]

$$\rho_b(n) = \frac{p_b(n)}{RT_b(n)} \quad (7)$$

In this manner, it is possible to calculate the volumetric efficiency correction factor Kv(n) in real time based on the amount of intake air Qa having passed through the throttle 4, the individual output values of the intake manifold pressure sensor 7, and the intake air temperature sensor 8, by the use of the expression (7).

However, minute measurement noise may be frequently contained in the above-mentioned sensor output values, and hence, errors may occur even if the cylinder intake air amount Qc(n)T(n) is calculated from the expression (3) by the use of the volumetric efficiency correction factor Kv(n) calculated by the expression (6).

In order to avoid the errors resulting from the above-mentioned noise, it is effective to attenuate a noise component by carrying out filtering processing with respect to the volumetric efficiency correction factor Kv(n) calculated by the expression (6), and then to calculate the expression (3) by the use of the volumetric efficiency correction factor Kvf(n) after the attenuation of the noise component (after filtering).

Specifically, the filtered volumetric efficiency correction factor Kvf(n) can be calculated by means of the filtering processing using a filter constant K1 (e.g., a value of about 0.9-0.99), as shown in the following expression (8).

[Expression 8]

$$Kvf(n) = K_1 \cdot Kvf(n-1) + (1-K_1) \cdot Kv(n) \quad (8)$$

Here, note that although in the expression (8), first-order low pass filtering processing has been applied in order to attenuate the noise component, the invention is not limited to this, but a value may be used which is obtained by carrying out simple moving average processing with respect to the values for the past several strokes, or a value may be used which is obtained by carrying out weighted moving average processing (i.e., processing to calculate an average value of individual data for the past several strokes by giving different weights to the individual data, respectively) or the like.

From the above-mentioned point of view, the filtered volumetric efficiency correction factor Kvf(n) is to be used as the volumetric efficiency correction factor Kv(n) in the expression (3).

Next, detailed reference will be made to the calculation processing of the cylinder intake air amount Qc (based on the expression (2), the expression (3), and the expression (5) through the expression (8)), which is carried out in the S/D method by the physical model 25 (the cylinder intake air amount calculation unit 21, the volumetric efficiency correction factor calculation unit 22, the throttle opening degree learning unit 23, and the intake manifold density calculation unit 24) in the ECU 20, while referring to a flow chart or routine in FIG. 3.

Figure 3:
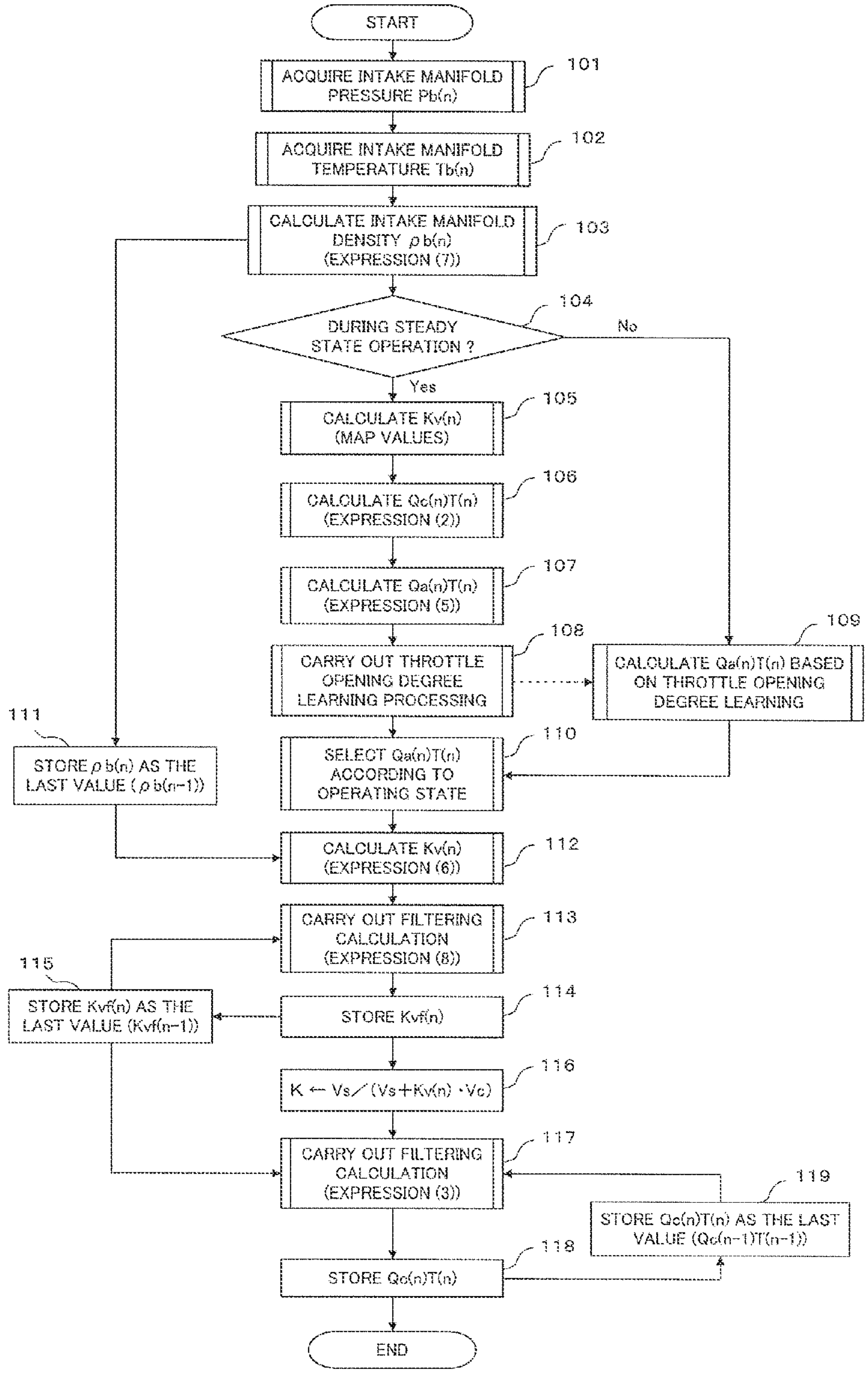
FIG. 3 is a flow chart showing calculation processing of an amount of intake air in a cylinder according to the first embodiment of the present invention.

The processing routine of FIG. 3 is carried out by interrupt processing (B05 processing) at each predetermined crank angle (e.g., BTDC 05 [degCA]) of the engine 1.

Here, note that the details of the learning processing by the throttle opening degree learning unit 23 will be described later together with FIG. 4 through FIG. 9.

In FIG. 3, first, the intake manifold density calculation unit 24 acquires the intake manifold pressure Pb(n) from the intake manifold pressure sensor 7 (step 101).

Here, note that the intake manifold pressure Pb(n) often vibrates in synchronization with the valve opening and closing, and hence, an intake manifold pressure average value for one stroke can be calculated, by integrating the output voltage of the intake manifold pressure sensor 7, while sampling it every 1.25 ms, and dividing an integrated value of the output voltage from the last interrupt processing until the current interrupt processing by the number of times or frequency of integration, and this average value thus obtained may be set as the intake manifold pressure Pb(n).

In addition, the intake manifold density calculation unit 24 also calculates an intake manifold pressure peak value for one stroke, at the time of acquiring the intake manifold pressure Pb(n).

Then, the intake manifold density calculation unit 24 acquires the intake manifold temperature Tb(n) from the intake air temperature sensor 8 (step 102).

With respect to the intake manifold temperature Tb(n), too, an average value thereof for one stroke may be used, similar to the intake manifold pressure Pb(n), but in general, the response of a temperature sensor is worse in comparison with that of a pressure sensor, so there will be no inconvenience even if an instantaneous temperature value is used.

Subsequently, the intake manifold density calculation unit 24 calculates the intake manifold density ρb(n) by using the above-mentioned expression (7) (step 103).

The calculated value in step 103 is stored as the last value (step 111), and is used as an intake manifold density ρb(n−1) before one stroke, in calculation processing of step 112 to be described later.

Then, by referring to the various kinds of sensor information, the ECU 20 determines whether the engine 1 is in the steady state operation (step 104), and when a determination is made that the engine 1 is not in the steady state operation but in the transient operation (that is, No), the routine shifts to calculation processing (step 109) of the amount of intake air Qa(n)T(n) based on a learning of the throttle opening degree.

Here, note that as a specific example of the determination of the steady state operation, there can be mentioned a condition in which a difference between the current actual VVT phase angle and the target VVT phase angle is within a predetermined angle (e.g., 1 [degCA]), and at the same time, individual deviations of the throttle opening degree, the intake manifold pressure, and the engine rotational speed for each predetermined period of time (e.g., 100 [ms]) are each within a predetermined ratio (e.g., 5-10 [%]), wherein in cases where this condition is satisfied, a determination can be made that the engine 1 is in the steady state operation.

In addition, in cases where the learning of the throttle opening degree (step 108) to be described later has not been completed, it is also possible to facilitate the learning of the throttle opening degree, by assuming at all times that the engine 1 is in the steady state operation, while fixing the target VVT phase angle to a reference position.

Moreover, in cases where the intake manifold pressure peak value is larger than the atmospheric air pressure PA, it is considered that there is air which is caused to flow backwards through the throttle valve **4*a* due to pressure vibration in the intake manifold, and in such a case, even if the amount of intake air Qa(n)T(n) having passed through the throttle 4 is calculated based on the effective opening area CAt of the throttle 4, an estimation error will become large. As a result, by assuming that the engine 1** is in the steady state operation, the deterioration of accuracy can be suppressed, so that the cylinder intake air amount Qc can be estimated with a degree of accuracy equivalent to that in the conventional S/D method.

On the other hand, when a determination is made in the above-mentioned step S104 that the engine 1 is in the steady state operation (that is, Yes), the volumetric efficiency correction factor calculation unit 22 calculates the volumetric efficiency correction factor Kv(n) by making reference to a table map of the intake manifold density ρb(n) and the volumetric efficiency correction factor Kv(n) (step 105).

The volumetric efficiency correction factor Kv(n) calculated in step 105 is values in a state of steady state operation, so ordinary map values, which have been adapted in advance, can be used for it.

Here, note that as map values of the volumetric efficiency correction factor Kv(n), it is only necessary to prepare them for two maps, i.e., for the case where the VVT phase angle is the reference position, and for the case where the VVT phase angle is at the time of a target VVT phase angle map, and hence, a particularly large number of adaptation man hours are not required.

Thereafter, the cylinder intake air amount calculation unit 21 calculates the cylinder intake air amount Qc(n)T(n) in the S/D method by the direct use of the above-mentioned expression (2) (step 106).

Also, the throttle opening degree learning unit 23 calculates the amount of intake air Qa(n)T(n) having passed through the throttle 4 by the use of the above-mentioned expression (5) (step 107).

Further, the throttle opening degree learning unit 23 carries out throttle opening degree learning processing based on the amount of intake air Qa(n)T(n) thus calculated (step 108).

Here, note that in the learning of the throttle opening degree, the relation between the throttle opening degree θ and the effective opening area CAt of the throttle 4 is learned, but the details thereof will be described later.

As described above, in cases where a determination is made in step 104 that the engine 1 is in the steady state operation (that is, Yes), the calculation of the amount of intake air Qa(n)T(n) and the learning of the throttle opening degree are carried out in steps 105 through 108.

On the other hand, when a determination is made in step 104 that the engine 1 is in the transient operation (that is, NO), the amount of intake air Qa(n)T(n) is calculated based on the relation between the throttle opening degree θ and the effective opening area CAt of the throttle 4, which has been learned in the steady state operation, by the use of expression (11) to be described later (step 109), after which the routine shifts to step 110.

Here, note that the effective opening area CAt used for the expression (11) can be calculated from the throttle opening degree θ and a CAt-θ table after learning correction.

In addition, it is possible to prevent erroneous learning from being carried out at the time of transient operation, by not updating the learning of the throttle opening degree in the transient operation.

Then, the ECU 20 selects a calculated value of the amount of intake air Qa(n)T(n) to be used for each calculation operation according to the operating state of the engine 1 (step 110).

That is, when the engine 1 is in the steady state operation, the amount of intake air Qa(n)T(n) calculated based on the expression (5) in step 107 is selected, and when the engine 1 is in the transient operation, the amount of intake air Qa(n)T(n) calculated based on the expression (11) in step 109 is selected.

Steps 112 through 119 are the same calculation processing as in the conventional AFS method which uses an air flow sensor.

First, in step 112, the volumetric efficiency correction factor calculation unit 22 calculates in real time the volumetric efficiency correction factor Kv(n) from the above-mentioned expression (6) by using the intake manifold density ρb(n) calculated in step 103, the actual amount of intake air Qa(n)T(n) [g] for one stroke calculated in step 110, and the last intake manifold density ρb(n−1) stored in step 111 (step 112).

Subsequently, the volumetric efficiency correction factor calculation unit 22 carries out filter processing for attenuating the noise component which is superimposed on the volumetric efficiency correction factor Kv(n) (step 113).

In step 113, in order to carry out the calculation processing represented by the above-mentioned expression (8), it is necessary to use the last value Kvf(n−1) of the filtered volumetric efficiency correction factor Kvf(n).

Accordingly, the volumetric efficiency correction factor calculation unit 22 stores the filtered volumetric efficiency correction factor Kvf(n) (step 114), which is the processing result of step 113, and keeps in memory the thus filtered volumetric efficiency correction factor, which has been stored in preceding step 114, as the last value Kvf(n−1) (step 115).

As a result of this, in the current step 113, the last fltered volumetric efficiency correction factor value Kvf (n−1) can be used.

According to the above steps 112 through 115, it is possible to calculate the volumetric efficiency correction factor Kv(n) and the filtered volumetric efficiency correction factor Kvf(n) with a high degree of accuracy by means of simple calculation operations, respectively.

In the subsequent calculation operations, the filtered volumetric efficiency correction factor Kvf(n) is to be used as the volumetric efficiency correction factor Kv(n).

Subsequently, the cylinder intake air amount calculation unit 21 in the physical model 25 indicating a response delay of the intake system calculates the filter constant K based on a factor calculation formula in the expression (3) (step 116), and further calculates the actual cylinder intake air amount Qc(n)T(n) according to a filter calculation formula in the expression (3) (step 117).

As the volumetric efficiency correction factor Kv(n−1) in the expression (3) before one stroke calculated in step 117, there is used the volumetric efficiency correction factor Kvf (n−1) before one stroke stored in step 115.

Finally, the cylinder intake air amount calculation unit 21 stores the actual cylinder intake air amount Qc(n)T(n) calculated in step 117 (step 118), and then ends the processing routine of FIG. 3.

Here, note that the cylinder intake air amount Qc(n)T(n) stored in step 118 is stored as the cylinder intake air amount Qc(n−1)T(n−1) before one stroke (step 119), and is used in step 117 in the next stroke.

According to the above-mentioned processing routine (steps S101-S119), the actual cylinder intake air amount Qc(n)T(n) can be calculated with a high degree of accuracy in the S/D method, too, by means of the same calculation operation as in the AFS method, without requiring a huge memory capacity.

Here, note that in the above-mentioned explanation, in order to suppress a sudden change of the cylinder intake air amount Qc(n)T(n), the value of the amount of intake air Qa(n)T(n) is changed over or switched according to the steady state operation and the transient operation (step 110), wherein in the steady state operation, the amount of intake air Qa(n)T(n) is calculated from the cylinder intake air amount Qc(n)T(n) by means of the S/D method (step 107), and in addition, the cylinder intake air amount Qc(n)T(n) is calculated again according to the filter calculation (step 117), but in the steady state operation, the amount of intake air Qc(n)T(n) calculated according to the S/D method may be used directly.

Next, the processing of the throttle opening degree learning unit 23 will be explained in further detail.

Here, note that the processing of the throttle opening degree learning unit 23 is basically the same as the processing shown in the afore-mentioned well-known literature (Japanese patent application laid-open No. 2008-57339).

First, a fundamental theoretical formula of hydrodynamics used in the throttle opening degree learning unit 23 will be explained.

In general, a volumetric flow rate formula used by a throttle type flow meter is represented, as shown in the following expression (9), by using the amount of intake air Qa [L/s], the speed of sound αa [m/s] in atmospheric air, the flow coefficient C, the opening area At [cm$^2$] of the throttle 4, the intake manifold pressure Pb [kPa], the atmospheric air pressure PA [kPa], and the ratio of specific heat K.

[Expression 9]

$$Qa = \alpha_a \cdot CA_t \cdot \sqrt{\frac{2}{\kappa-1}\left[\left(\frac{P_b}{P_A}\right)^{\frac{2}{\kappa}} - \left(\frac{P_b}{P_A}\right)^{\frac{\kappa+1}{\kappa}}\right]} \tag{9}$$

In the expression (9), the product of the flow coefficient C and the throttle opening area At is the effective opening area CAt.

Here, a non-dimensional flow rate σ is defined as shown in the following expression (10).

[Expression 10]

$$\sigma = \sqrt{\frac{2}{\kappa-1}\left[\left(\frac{P_b}{P_A}\right)^{\frac{2}{\kappa}} - \left(\frac{P_b}{P_A}\right)^{\frac{\kappa+1}{\kappa}}\right]} \tag{10}$$

When the expression (10) is assigned to the expression (9), the expression (9) can be simplified as shown in the following expression (11).

[Expression 11]

$$Qa=\alpha_a \cdot CA_t \cdot \sigma \quad (11)$$

Here, note that, the speed of sound αa [m/s] in atmospheric air is represented, as shown in the following expression (12), by using the gas constant R[kJ/(kg·K)] and the atmospheric air temperature Ta[K].

[Expression 12]

$$\alpha_a=\sqrt{KRT_a} \quad (12)$$

In the expression (11), when the values of the amount of intake air Qa, the speed of sound in atmospheric air αa and the non-dimensional flow rate σ are given, the effective opening area CAt (the flow coefficient C×the throttle opening area At) can be calculated by the following expression (13) which is obtained by transforming the expression (11).

[Expression 13]

$$CA_t = \frac{Qa}{\alpha_a \cdot \sigma} \quad (13)$$

Next, more specific reference will be made to the throttle control processing and the throttle opening degree learning processing of the throttle opening degree learning unit 23 using the above-mentioned theoretical formula, while referring to FIG. 4.

Figure 4:
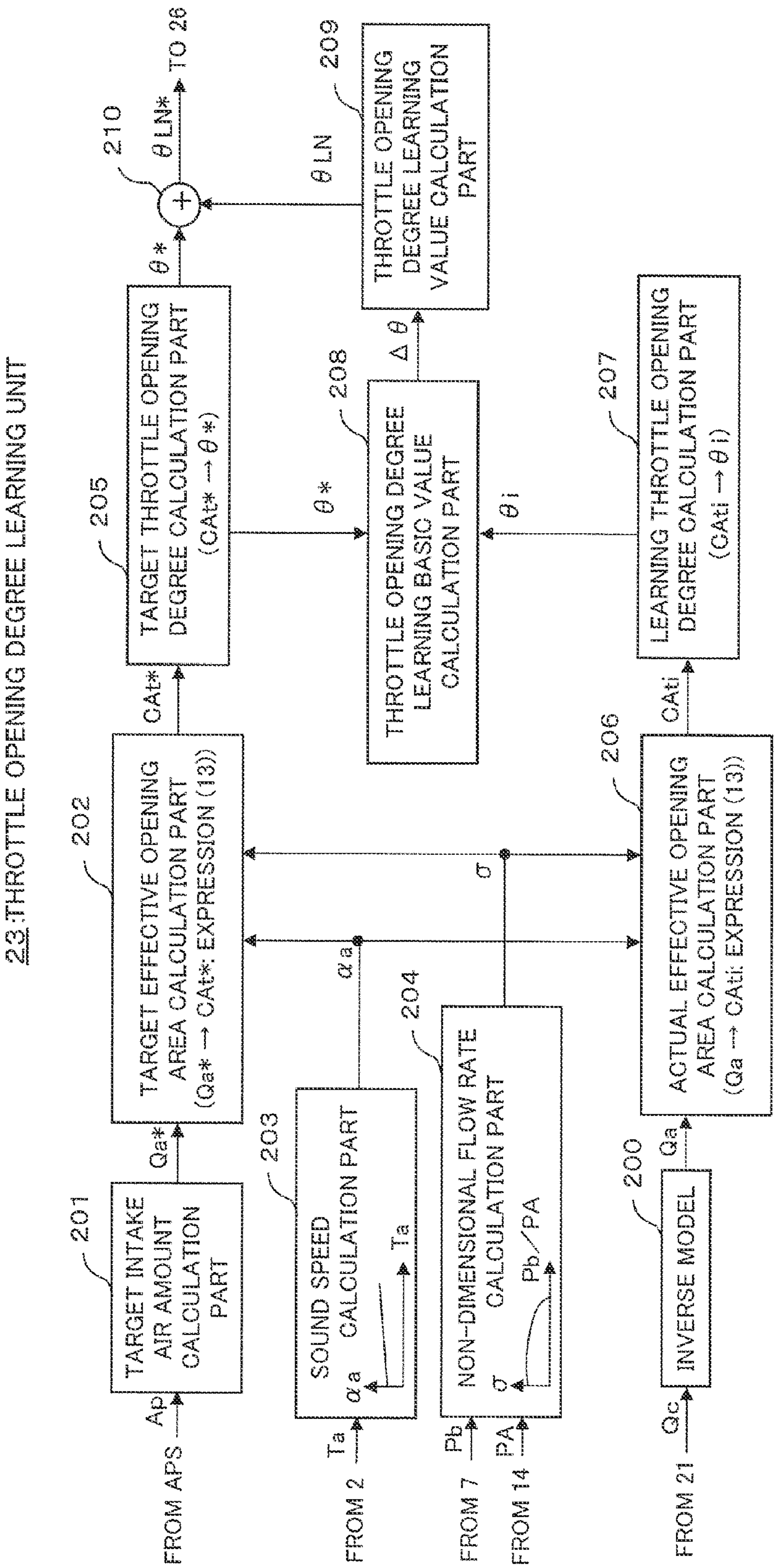
FIG. 4 is a block diagram showing a functional construction of a throttle opening degree learning unit in FIG. 2.

FIG. 4 is a block diagram showing a functional construction of the throttle opening degree learning unit 23.

In FIG. 4, the throttle opening degree learning unit 23 is provided with an inverse model 200 that calculates the amount of intake air Qa from the cylinder intake air amount Qc, a target intake air amount calculation part 201, a target effective opening area calculation part 202, a sound speed calculation part 203, a non-dimensional flow rate calculation part 204, a target throttle opening degree calculation part 205, an actual effective opening area calculation part 206, a learning throttle opening degree calculation part 207, a throttle opening degree learning basic value calculation part 208, a throttle opening degree learning value calculation part 209, and an adder 210.

The target intake air amount calculation part 201 calculates an engine output index such as the target torque, etc., based on the variety of kinds of input data including the accelerator opening degree Ap, and calculates a target cylinder intake air amount Qc* necessary to achieve the engine output index, and calculates a target amount of intake air Qa* passing through the throttle 4 based on the target cylinder intake air amount Qc*.

The target effective opening area calculation part 202 calculates a target effective opening area CAt* which becomes a control target value of the throttle 4 for achieving the target amount of intake air Qa*, by using the expression (13), based on the target amount of intake air Qa*, the speed of sound αa, and the non-dimensional flow rate σ.

In this manner, by calculating the target effective opening area CAt* based on the volumetric flow rate formula (the expression (9) and the expression (11)) of the throttle type flow meter, it is possible to calculate the target effective opening area CAt* for achieving the target amount of intake air Qa* in a good manner, even in cases where there has occurred a change of the environmental condition or a change in the operating state of the engine 1 such as the introduction of EGR.

Here, note that to calculate the speed of sound αa necessary for the calculation operation of the target effective opening area calculation part 202 within the ECU 20 by the use of the expression (12) results in a huge arithmetic calculation load in the ECU 20, and hence, is not practical.

Accordingly, in order to suppress the calculation load of the ECU 20, the target sound speed calculation part 203 has calculated theoretical values of the speed of sound in atmospheric air αa and has stored the speed of sound αa thus calculated as a table taking the atmospheric air temperature Ta as an axis in advance, so that the speed of sound αa is calculated from the atmospheric air temperature Ta by the use of the map before the calculation of the target effective opening area calculation part 202 is executed.

Similarly, to calculate the non-dimensional flow rate σ necessary for the calculation operation of the target effective opening area calculation part 202 within the ECU 20 by the use of the expression (10) results in a huge arithmetic calculation load in the ECU 20, and hence, is not practical.

Accordingly, the non-dimensional flow rate calculation part 204 has calculated theoretical values of the non-dimensional flow rate σ and has stored the non-dimensional flow rate σ thus calculated as a table taking the pressure ratio Pb/PA of the intake manifold pressure Pb and the atmospheric air pressure PA as an axis in advance, so that the pressure ratio Pb/PA is calculated and the non-dimensional flow rate σ is calculated from the pressure ratio Pb/PA by the use of the map before the calculation of the target effective opening area calculation part 202 is executed.

In addition, in general, it is known that in cases where the pressure ratio Pb/PA is equal to or less than a first predetermined value (e.g., about 0.528 in the case of air), the amount of intake air Qa passing through the throttle 4 will be saturated (choked), and it is also known that in the case of the occurrence of a choke, the non-dimensional flow rate σ calculated by the expression (10) will become a constant value.

Accordingly, in cases where the pressure ratio Pb/PA is equal to or less than the first predetermined value, the non-dimensional flow rate calculation part 204 acts to fix the value of the non-dimensional flow rate σ on the table map to a constant value (e.g., about 0.5787 in the case of air) which corresponds to the first predetermined value, thereby making it possible to deal with the case where a choke has occurred, too.

In addition, when the pressure ratio Pb/PA becomes large to some extent, the vibration of the intake manifold pressure Pb due to the pulsation of intake air may provide a large influence on the non-dimensional flow rate σ.

Accordingly, in cases where the pressure ratio Pb/PA is equal to or greater than a second predetermined value (e.g., about 0.95), the non-dimensional flow rate calculation part 204 acts to handle the value of the non-dimensional flow rate σ on the table map as a constant value (e.g., about 0.26) which corresponds to the second predetermined value, so that the influence of the pulsation of intake air is suppressed, thereby ensuring the controllability of the throttle 4.

Here, note that in cases where the intake manifold pressure peak value is larger than the atmospheric air pressure PA, it is considered that there is air which is caused to flow backwards through the throttle valve 4*a* due to pressure vibration in the intake manifold, and hence, the value of the non-dimensional flow rate σ on the table map of the non-dimensional flow rate calculation part 204 may be handled as the constant value (e.g., about 0.26) which corresponds to the second predetermined value.

Then, the target throttle opening degree calculation part 205 calculates the target throttle opening degree θ* by the use of the target effective opening area CAt* which has been calculated by the target effective opening area calculation part 202.

At this time, the target throttle opening degree calculation part 205 has measured in advance the relation of the effective opening area CAt and the throttle opening degree θ which was calculated according to the expression (13) by the use of the actual amount of intake air Qa calculated according to the above-mentioned expression (5) (step 107), and has stored it as a table where the effective opening area CAt and the throttle opening degree θ correspond to each other by one to one, whereby the target throttle opening degree calculation part 205 calculates the target throttle opening degree θ* by using this table map.

In cases where the throttle 4 is controlled by using the target throttle opening degree θ* calculated by the target throttle opening degree calculation part 205 as it is, an error will occur between the target amount of intake air Qa* and the actual amount of intake air Qa, resulting from the variations of the throttle body and the variety of kinds of sensors, or a variety of kinds of estimation errors, etc.

Accordingly, the throttle opening degree learning value calculation part 209 calculates a throttle opening degree learning value θLN for correcting the target throttle opening degree θ* in the following way, in order to decrease the error in the amount of intake air.

First, the actual effective opening area calculation part 206 calculates an actual effective opening area CAti used for learning by the use of the actual amount of intake air Qa which has been calculated by the inverse model 200 (in step 107), and the speed of sound αa and the non-dimensional flow rate σ.

In addition, the learning throttle opening degree calculation part 207 calculates a throttle opening degree θi for learning (hereinafter referred to as a learning throttle opening degree θi) from the actual effective opening area CAti, by using the same table as that in the target throttle opening degree calculation part 205.

Subsequently, the throttle opening degree learning basic value calculation part 208 calculates an opening degree deviation (=θ*−θi) between the target throttle opening degree θ* and the learning throttle opening degree θi as a throttle opening degree learning basic value Δθ.

Thereafter, the throttle opening degree learning value calculation part 209 calculates the throttle opening degree learning value θLN, such as by integrating the throttle opening degree learning basic value Δθ or the like.

Here, note that the calculation processing of a real-time learning value θR and a long time learning value θL (to be described later together with FIG. 7), which are used for the calculation of the throttle opening degree learning value θLN, and the storing processing of the long time learning value θL are carried out in the throttle opening degree learning value calculation part 209.

Finally, the adder 210 calculates the learning corrected target throttle opening degree θLN* for driving the throttle 4 by adding the target throttle opening degree θ* calculated by the target throttle opening degree calculation part 205, and the throttle opening degree learning value θLN calculated by the throttle opening degree learning value calculation part 209 to each other, and inputs it to the control amount calculation unit 26.

In this manner, the throttle opening degree learning unit 23 calculates the throttle opening degree learning value θLN based on the throttle opening degree learning basic value Δθ (the deviation between the target throttle opening degree θ* and the learning throttle opening degree θi), so that it is made possible to generate the learning corrected target throttle opening degree θLN*, which is obtained by correcting the target throttle opening degree θ* by the throttle opening degree learning value θLN, thus making it possible to control the throttle opening degree θ with a high degree of accuracy.

In the following, the function of the throttle opening degree learning unit 23 in FIG. 4 will be explained in a more specific manner, while referring to FIG. 5.

Figure 5:
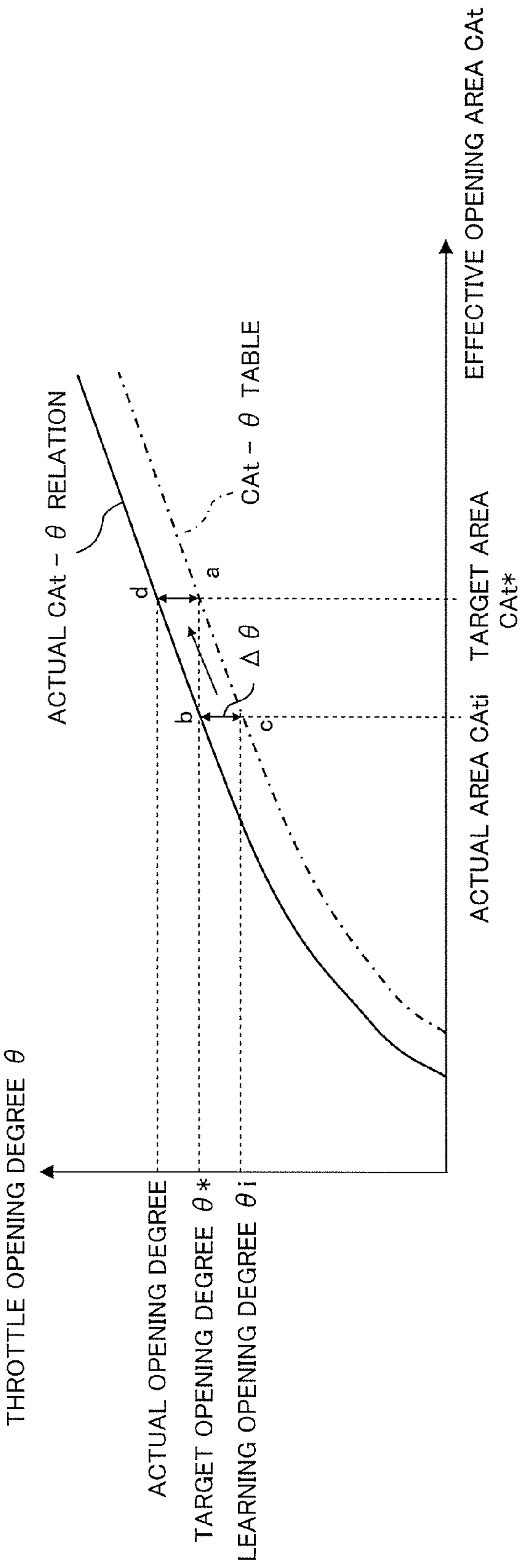
FIG. 5 is an explanatory view specifically showing throttle opening degree learning processing according to the first embodiment of the present invention.

FIG. 5 is an explanatory view specifically showing throttle opening degree learning processing according to the first embodiment of the present invention, wherein the axis of abscissa represents the effective opening area CAt, and the axis of ordinate represents the throttle opening degree θ.

First, assuming that the effective opening area CAt and the throttle opening degree θ correspond to each other by one to one, in cases where an error exists between the target amount of intake air Qa* and the actual amount of intake air Qa, there will also exist an error between the target effective opening area CAt* calculated from the target amount of intake air Qa* and the actual effective opening area CAti calculated from the actual amount of intake air Qa.

In FIG. 5, there is shown a case in which an error has occurred between the CAt-θ table (denoted by an alternate long and short dash line) used for control by the target throttle opening degree calculation part 205 and the learning throttle opening degree calculation part 207, and the relation (denoted by a solid line) between the actual effective opening area CAt and the throttle opening degree θ in the engine 1 which is currently to be controlled.

Hereinafter, the relation between the actual effective opening area CAt and the throttle opening degree θ is referred to simply as an "actual CAt-θ relation".

The actual CAt-θ relation is calculated by estimation, including a variation of the throttle body in the throttle 4, and variations of the variety of kinds of sensors which serve to measure the intake manifold pressure Pb, the atmospheric air pressure PA, the intake manifold temperature Tb, and so on.

In FIG. 5, the relation between the target effective opening area CAt* and the target throttle opening degree θ* is indicated by a point a on the CAt-θ table.

However, an error exists between the CAt-θ table (denoted by the alternate long and short dash line) and the actual CAt-θ relation (denoted by the solid line), and hence, the effective opening area corresponding to the target throttle opening degree θ* becomes the actual effective opening area CAti (<CAt*) which corresponds to a point b on the actual CAt-θ relation (the solid line).

Accordingly, the actual effective opening area CAti is different from the target effective opening area CAt*, so the actual amount of intake air Qa obtained at the time when the throttle opening degree is controlled to the target throttle opening degree θ* will become a value corresponding to the actual effective opening area CAti (<CAt*), and will not coincide with the target amount of intake air Qa*.

Accordingly, in order to calculate the learning value for correcting the above-mentioned error, the actual effective opening area calculation part 206 in the throttle opening degree learning unit 23 calculates the actual effective opening area CAti based on the actual amount of intake air Qa measured at the time when the throttle opening degree is controlled to the target throttle opening degree θ*.

The relation between the actual effective opening area CAti and the target throttle opening degree θ* is indicated by the point b on a curve of the actual CAt-θ relation (solid line) in FIG. 5.

As is clear from FIG. 5, in order to achieve the target effective opening area CAt* (corresponding to the target amount of intake air Qa*), it is necessary to control the throttle opening degree θ to a point d on the curve of the actual CAt-θ relation (solid line), so there is a need to calculate a difference between the point a and the point d as a learning value.

At this time, the learning throttle opening degree calculation part 207 assumes that the CAt-θ table (the alternate long and short dash line) and the actual CAt-θ relation (the solid line) are locally in a substantially parallel relation in a region to be corrected (refer to an arrow in FIG. 5), and calculates the learning throttle opening degree θi by the use of the CAt-θ table (the alternate long and short dash line), based on the actual effective opening area CAti calculated from the actual amount of intake air Qa at the time when the throttle opening degree is controlled to the target throttle opening degree θ*.

The relation between the learning throttle opening degree θi calculated by the learning throttle opening degree calculation part 207 and the actual effective opening area CAti is indicated by a point c on the CAt-θ table (the alternate long and short dash line) in FIG. 5.

Accordingly, it can be assumed that the throttle opening degree learning basic value Δθ (=θ*−θi), which is composed of a difference between the point b and the point c, is substantially equal to a learning basic value between the point a and the point d.

The throttle opening degree learning basic value calculation part 208 calculates the throttle opening degree learning basic value Δθ, as shown in FIG. 5, and the throttle opening degree learning value calculation part 209 uses, as the throttle opening degree learning value θLN, a value which is obtained by integrating the throttle opening degree learning basic value Δθ multiplied by a gain.

Hereinafter, the adder 210 controls the throttle opening degree θ by means of the learning corrected target throttle opening degree θLN*, which is obtained by adding the throttle opening degree learning value θLN to the target throttle opening degree θ*.

As a result of this, the error between the target amount of intake air Qa* and the actual amount of intake air Qa decreases.

In this manner, at the time of calculating the target throttle opening degree θ* for achieving the target amount of intake air Qa*, it is possible to carry out the learning correction of the relation between the effective opening area CAt and the throttle opening degree θ, so that the target amount of intake air Qa* can be achieved in a good manner, with respect to errors resulting from the variations of the throttle body and the variety of kinds of sensors, etc., as well as from a variety of kinds of estimation calculations.

At this time, when the error between the CAt-θ table (the alternate long and short dash line) and the actual CAt-θ relation (the solid line) is in a substantially constant (substantially parallel) relation all over the whole area or region, as shown in FIG. 5, it becomes possible to carry out good control in the whole operation or driving range, even in cases where only the throttle opening degree learning value θLN is used by being independently controlled in a feedback manner.

However, the state the CAt-θ table can take with respect to the actual CAt-θ relation is not limited to the relation of FIG. 5, but can be considered in a variety of ways.

Figure 6:
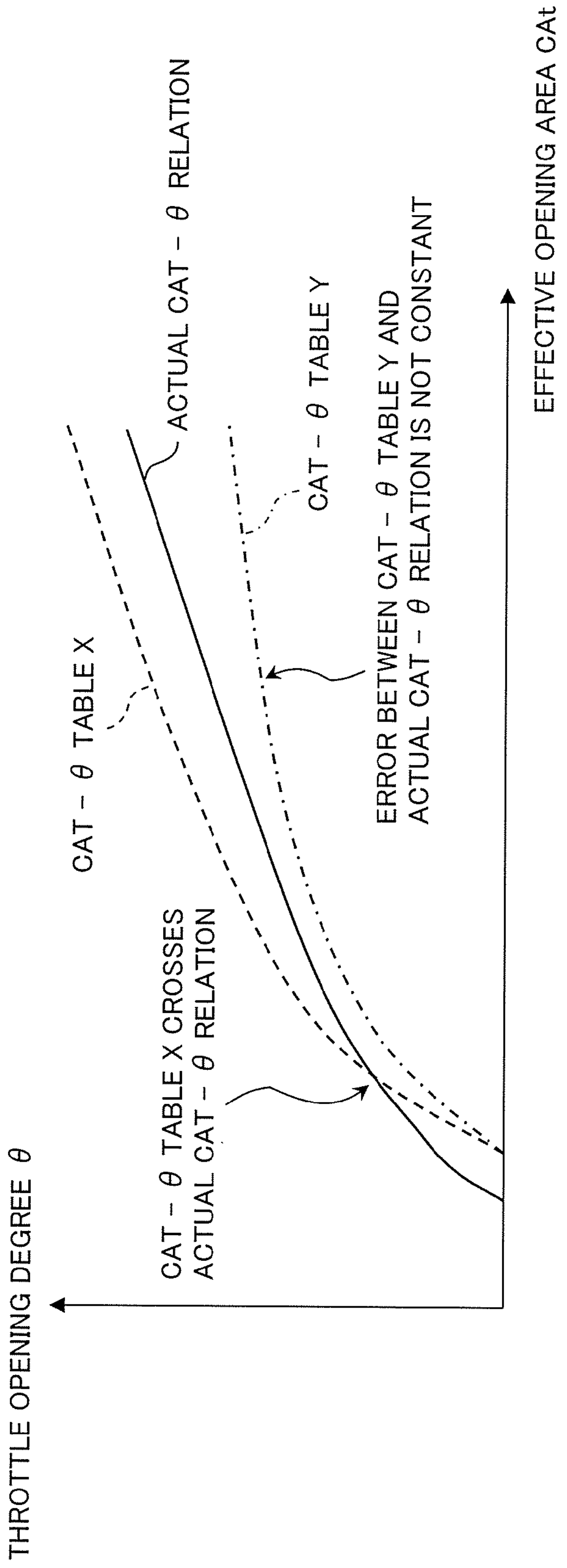
FIG. 6 is an explanatory view showing the states CAt-θ tables can take with respect to an actual CAt-θ relation.

FIG. 6 is an explanatory view showing the states CAt-θ tables X, Y (a broken line, and an alternate long and short dash line) can take with respect to the actual CAt-θ relation (a solid line).

In FIG. 6, the CAt-θ table X (the broken line) crosses the actual CAt-θ relation (the solid line).

In addition, the CAt-θ table Y (the alternate long and short dash line) has an error which is not constant (parallel) with respect to the actual CAt-θ relation (the solid line).

In the case as shown in FIG. 6, when the throttle opening degree learning value θLN is independently used, there will be a possibility that problems such as a following delay, an overshoot, etc., may occur at the time of transient operation.

Figure 7:
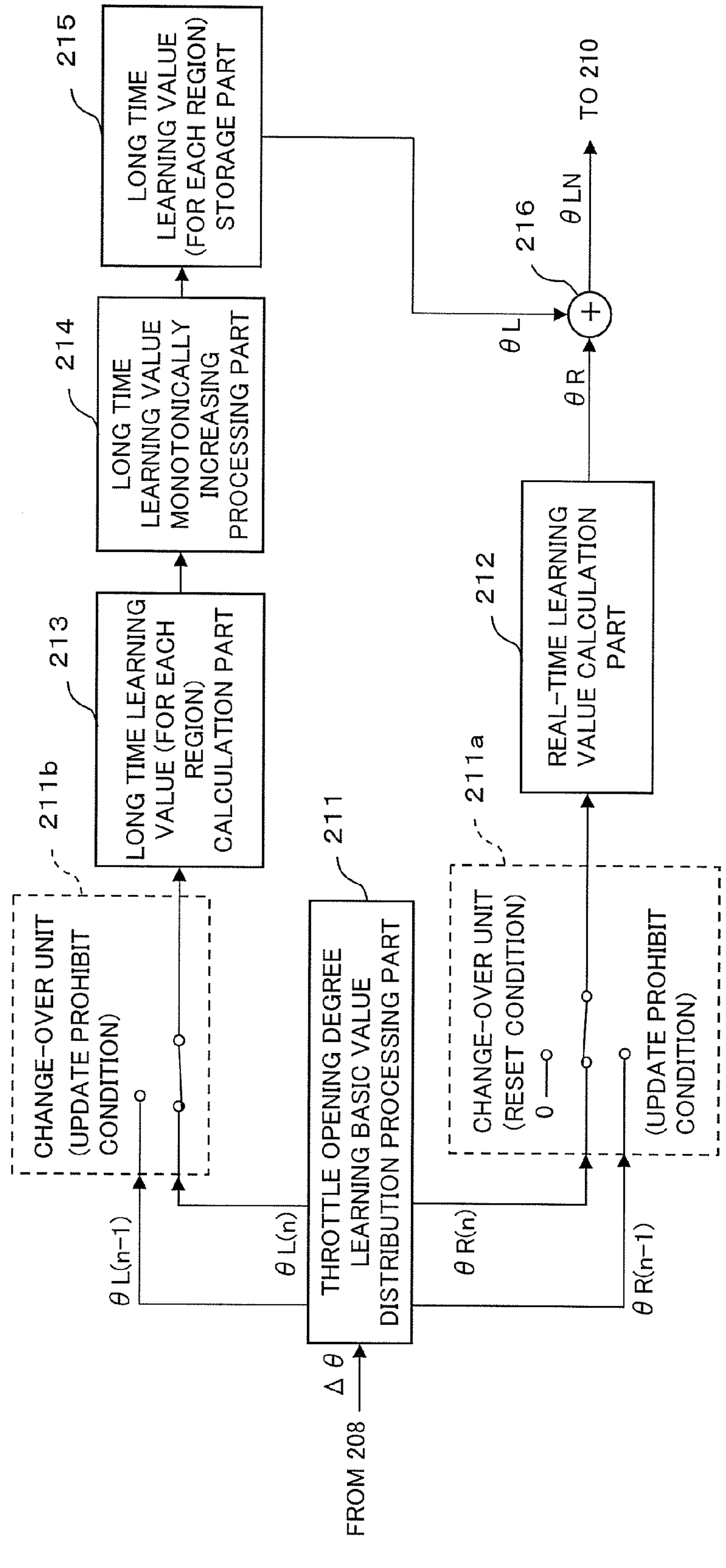
FIG. 7 is a block diagram showing a functional construction of a throttle opening degree learning value calculation part in FIG. 4.

Accordingly, in order to cope with the above-mentioned problems, the throttle opening degree learning unit 23 distributes the throttle opening degree learning basic value Δθ to the real-time learning value θR, which is used for feedback control, and the long time learning value θL, which is stored for each learning region corresponding to a CAt axis (the axis of abscissa in FIG. 5 and FIG. 6) of the CAt-θ table, as shown in FIG. 7, and calculates the sum of both of them as the throttle opening degree learning value θLN.

According to this, the sum of each value on the CAt-θ table and the long time learning value θL can be brought close to the actual CAt-θ relation (the solid line).

In addition, by using together the real-time learning value θR in combination therewith, it is possible to absorb instantaneous errors by means of feedback control.

Hereinafter, detailed reference will be made to the calculation processing of the throttle opening degree learning value θLN and the storing processing of the long time learning value θL, while referring to FIG. 7.

FIG. 7 is a block diagram showing a functional construction of the throttle opening degree learning value calculation part 209 in the throttle opening degree learning unit 23.

In FIG. 7, the throttle opening degree learning value calculation part 209 is provided with a throttle opening degree learning basic value distribution processing part 211, change-over units 211*a*, 211*b*, a real-time learning value calculation part 212, a long time learning value calculation part 213, a long time learning value monotonically increasing processing part 214, a long time learning value storage part 215, and an adder 216.

The throttle opening degree learning basic value distribution processing part 211 carries out distribution processing of the throttle opening degree learning basic value Δθ at a predetermined ratio, thereby to generate a real-time learning value θR(n) and a long time learning value θL(n).

In addition, the throttle opening degree learning basic value distribution processing part 211 has a last value storage unit, and generates the last long time learning value θL(n−1) and the last real-time learning value θR(n−1).

At normal time in which both a reset condition and an update prohibition condition of the real-time learning value θR (to be described later) are not satisfied, the real-time side change-over unit 211*a* selects the current real-time learning value θR(n) (a value which has been distributed from the throttle opening degree learning basic value Δθ), and inputs it to the real-time learning value calculation part 212.

In addition, in cases where the reset condition of the real-time learning value θR is satisfied, the change-over unit 211*a* selects “0”, and inputs “0” to the real-time learning value calculation part 212.

Further, in cases where the update prohibition condition of the real-time learning value θR is satisfied, the change-over unit 211*a* selects the last real-time learning value θR(n−1), and inputs it to the real-time learning value calculation part 212.

In cases where the reset condition and the update prohibition condition of the real-time learning value θR are not satisfied, the real-time learning value calculation part 212 calculates a final real-time learning value θR based on the real-time learning value θR(n) distributed from the throttle opening degree learning basic value Δθ.

On the other hand, at normal time in which an update prohibition condition of the long time learning value θL is not satisfied, the long time side change-over unit 211*b* selects the current long time learning value θL(n) (a value which has been distributed from the throttle opening degree learning basic value Δθ), and inputs it to the long time learning value calculation part 213 for each learning region.

Moreover, in cases where the update prohibition condition of the long time learning value θL is satisfied, the change-over unit 211*b* selects the last long time learning value θL(n−1), and inputs it to the long time learning value calculation part 213 for each learning region.

In cases where the update prohibition condition of the long time learning value θL is not satisfied, the long time learning value calculation part 213 for each learning region calculates a basic long time learning value for each learning region according to the CAt axis of the CAt-θ table (map), based on the long time learning value θL(n) distributed from the throttle opening degree learning basic value Δθ.

Here, note that, as an example of the update prohibition conditions in the change-over units 211*a*, 211*b*, there is mentioned a case where the pressure ratio Pb/PA of the intake manifold pressure Pb and the atmospheric air pressure PA indicates equal to or more than the second predetermined value (e.g., about 0.95), or a case where the intake manifold pressure peak value is larger than the atmospheric air pressure PA.

This is because in this case, an error occurs in the calculation operation of the above-mentioned expression (10), so it is necessary to prohibit the update of the real-time learning value θR and the long time learning value θL.

In addition, as an example of the reset condition in the change-over unit 211*a*, there is mentioned a case where the time elapsed after the rate of temporal change dQa*/dt of the target amount of intake air Qa* has reached a value equal to or greater than a third predetermined value indicates within a predetermined period of time.

This condition corresponds to a case where a transient operation is detected, and it is possible to suppress erroneous learning by resetting the real-time learning value θR.

Here, note that the above-mentioned reset condition can also be used as the update prohibition condition of the long time learning value θL in the change-over unit 211*b*, and it is possible to suppress erroneous learning in a similar manner.

The long time learning value monotonically increasing processing part 214 limits the long time learning value θL in such a manner that the CAt-θ table and the actual CAt-θ relation after the additive correction of a final long time learning value θL each become a monotonically increasing state.

This is also processing for suppressing erroneous learning, and is also processing for maintaining the relation between the throttle opening degree θ and the amount of intake air Qa in a monotonically increasing state.

The long time learning value storage part 215 stores the final long time learning value θL through the long time learning value monotonically increasing processing part 214 for each learning region.

The adder 216 adds the real-time learning value θR and the long time learning value θL to each other thereby to calculate the throttle opening degree learning value θLN, and inputs it to the adder 210 in FIG. 4.

Here, note that in the long time learning value storage part 215, the long time learning value θL is stored in a backup memory.

That is, during the stop of the engine 1 or at the time when the power of the ECU 20 is turned off, the real-time learning value θR is reset, but the long time learning value θL is held by the backup memory.

Next, specific reference will be made to the calculation processing and the storing processing for each learning region of the long time learning value θL by the long time learning value calculation part 213 through the long time learning value storage part 215 in FIG. 7, while referring to FIG. 8 and FIG. 9 together with FIG. 5 and FIG. 7.

Figure 8:
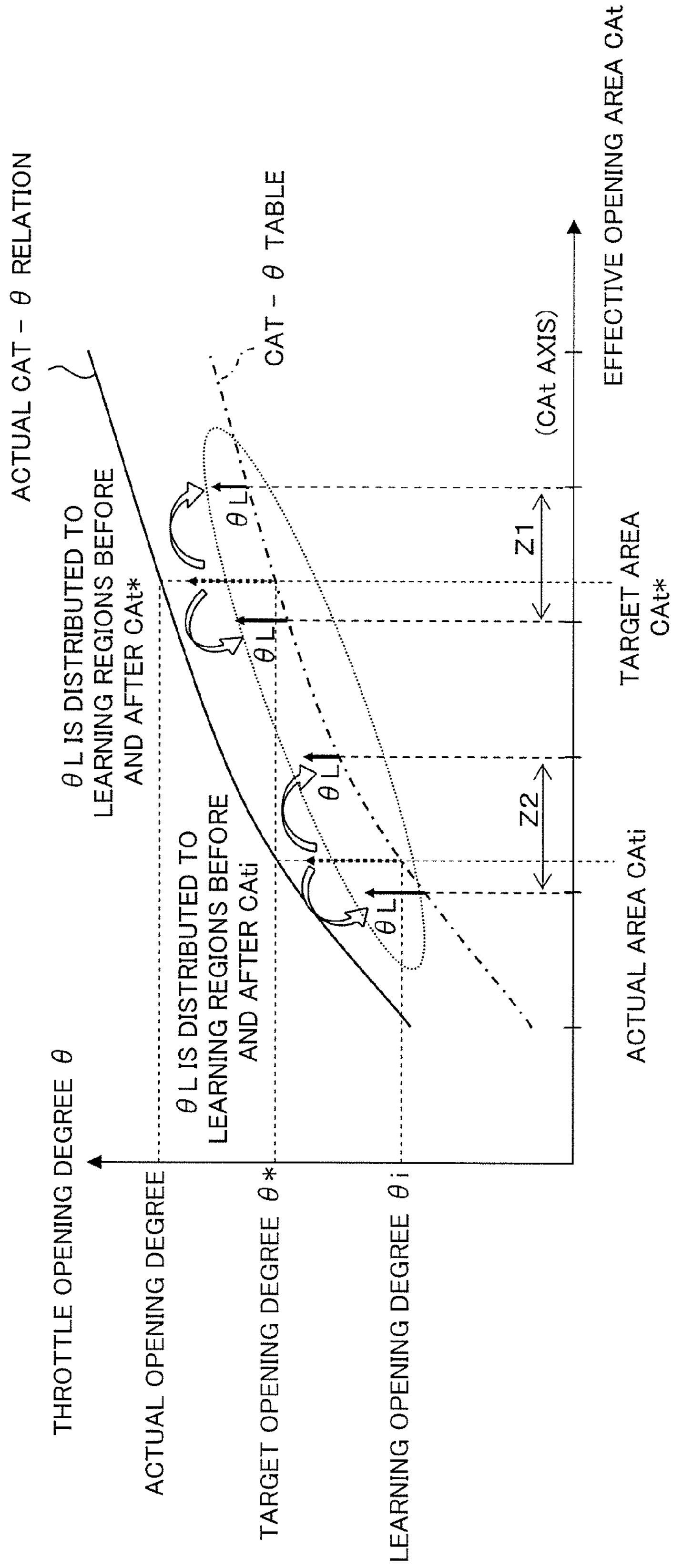
FIG. 8 is an explanatory view showing processing operations by a long time learning value calculation part and a long time learning value storage part in FIG. 7.
Figure 9:
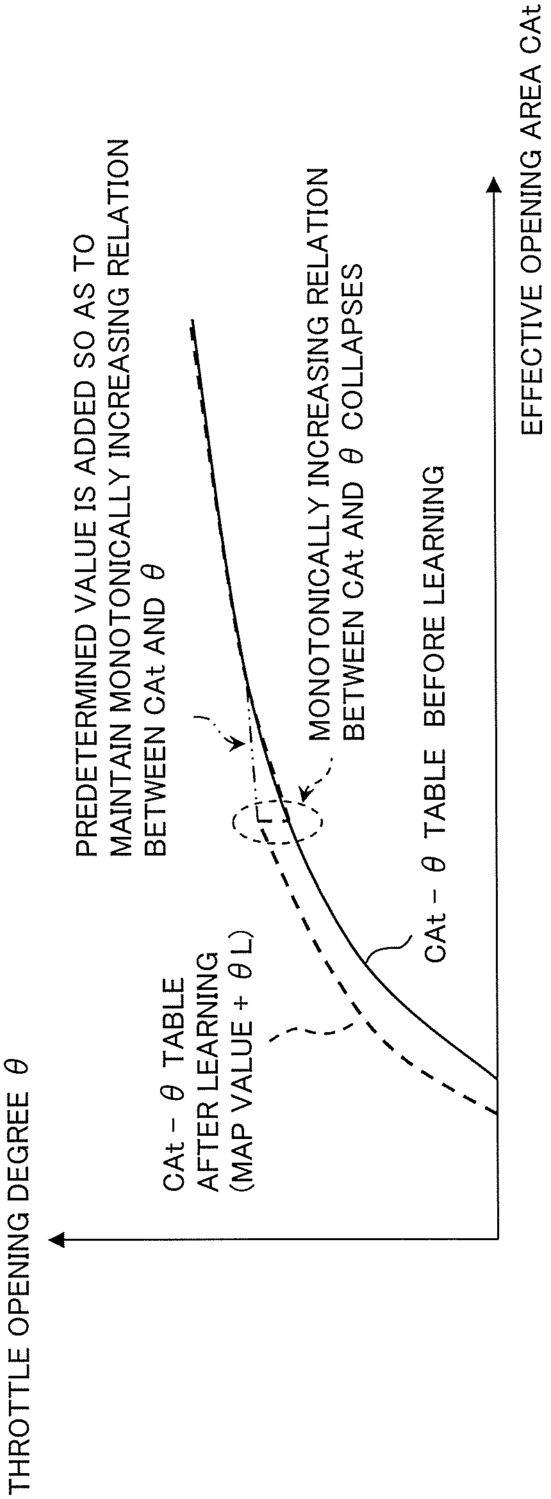
FIG. 9 is an explanatory view showing a processing operation by a long time learning value monotonically increasing processing part in FIG. 7.

FIG. 8 is an explanatory view showing processing operations by the long time learning value calculation part 213 and the long time learning value storage part 215, and FIG. 9 is an explanatory view showing a processing operation by the long time learning value monotonically increasing processing part 214.

In FIG. 5, as mentioned above, the throttle opening degree learning basic value Δθ is a difference between the point b and the point c, but is also applied as a learning value between the point a and the point d.

Here, consideration will be given to a case where the throttle opening degree learning basic value Δθ is distributed to and stored for each learning region which corresponds one to one to the CAt axis of the CAt-θ table, for example.

At this time, as shown in FIG. 8, it is possible to store the throttle opening degree learning basic value Δθ as the long time learning value θL in at least one of a learning region Z1 which corresponds to the CAt axis before and after the target effective opening area CAt*, and a learning region Z2 which corresponds to the CAt axis before and after the actual effective opening area CAti.

Here, note that the long time learning value θL to be stored in each of the learning regions Z1, Z2 corresponding to the CAt axis can be calculated by adding a predetermined value based on the throttle opening degree learning basic value Δθ to the last long time learning value θL(n−1).

Alternatively, the long time learning value θL to be stored in each of the learning regions Z1, Z2 can be calculated by calculating a value corresponding to a ratio between a distance from the above-mentioned predetermined value to the CAt axis before and after the target effective opening area CAt* and a distance from the above-mentioned predetermined value to the CAt axis before and after the actual effective opening area CAti, and adding the thus calculated value to the last long time learning value θL(n−1).

In addition, a convergence time of the long time learning value θL can be shortened by storing the long time learning value θL in both of the target effective opening area CAt* and the actual effective opening area CAti.

In cases where the long time learning value θL is calculated in this manner, a condition under which learning can be made is only a case where the update prohibition condition is not satisfied (to be describes later), and hence, to actually carry out learning is limited only to a commonly used region of the steady state operation.

In addition, in general, the throttle opening degree θ and the amount of intake air Qa are in a monotonically increasing relation, so the relation between the effective opening area CAt and the throttle opening degree θ also needs to be a monotonically increasing relation.

However, in cases where learning is carried out locally, there can be a case where the value of the sum (a broken line) of the value of the CAt-θ table (a solid line) and the long time learning value θL does not become monotonically increasing, as shown by a broken line and a broken line frame in FIG. 9.

As shown in FIG. 9, in cases where the monotonically increasing relation collapses, for example, in spite of the fact that the target amount of intake air Qa* increases, the learning corrected target throttle opening degree θLN* will decrease, so there may arise a problem of the reduction in the output power of the engine 1 or the erroneous learning of the throttle opening degree learning value θLN.

Accordingly, the long time learning value monotonically increasing processing part 214 in FIG. 7 carries out processing to limit the long time learning value θL for each of the learning regions Z1, Z2 of the long time learning value θL, in such a manner that the value of the sum (a dotted line) of the value of the CAt-θ table (the solid line) and the long time learning value θL becomes monotonically increasing, as shown by a two-dot chain line in FIG. 9.

As a result of this, it is possible to prevent the erroneous learning or malfunction of the throttle opening degree learning value θLN.

In addition, the throttle opening degree learning unit 23 can learn the relation between the throttle opening degree θ and the effective opening area CAt.

As described above, the estimation device for a cylinder intake air amount in an internal combustion engine according to the first embodiment (FIG. 1 through FIG. 9) of the present invention, which serves for estimating an amount of intake air Qc sucked into a cylinder in the engine 1 (internal combustion engine) connected to the intake pipe at a location downstream of the throttle valve 4*a*, is provided with: the variety of kinds of sensors that detect the operating state of the internal combustion engine related to the variety of kinds of actuators of the engine 1; and the physical model 25 that models a response delay of the intake system until the air having passed through the throttle valve 4*a* comes into the cylinder, by using detected values of the variety of kinds of sensors as input information.

The variety of kinds of actuators include the throttle 4 (a throttle opening degree control unit) that regulates the amount of air passing through the throttle valve 4*a* by controlling the throttle opening degree θ of the throttle valve 4*a* thereby to change the effective opening area CAt thereof.

The variety of kinds of sensors include the atmospheric air temperature sensor 2 that detects the atmospheric air temperature Ta at the atmospheric air side of the throttle valve 4*a*, the atmospheric air pressure sensor 14 that detects the atmospheric air pressure PA at the atmospheric air side of the throttle valve 4*a*, and the intake manifold pressure sensor 7 that detects the pressure in the intake pipe at the downstream side of the throttle valve 4*a* as the intake manifold pressure Pb.

The physical model 25 is provided with: the volumetric efficiency correction factor calculation unit 22 that calculates the volumetric efficiency correction factor Kv (the volumetric efficiency corresponding value) which is an index indicating the cylinder intake air amount Qc; the throttle opening degree learning unit 23 that calculates the learning corrected target throttle opening degree θLN* for achieving the target amount of intake air Qa* by learning the relation between the throttle opening degree θ and the effective opening area CAt; and the cylinder intake air amount calculation unit 21 that calculates the actual cylinder intake air amount Qc.

At the time of steady state operation of the engine 1, the physical model 25 estimates the actual cylinder intake air amount Qc by the use of the intake manifold pressure Pb and the volumetric efficiency correction factor Kv, and at the same time, carries out opening degree learning by the throttle opening degree learning unit 23 based on the actual cylinder intake air amount Qc.

In addition, at the time of transient operation, the physical model 25, after stopping the opening degree learning, estimates the amount of intake air Qa having passed through the throttle valve 4*a*, by applying the actual effective opening area CAti calculated from the throttle opening degree θ and a result of the opening degree learning, the intake manifold pressure Pb, the atmospheric air pressure PA and the atmospheric air temperature Ta to a flow rate calculation expression of the throttle type flow meter, and at the same time, carries out the calculation of the actual cylinder intake air amount Qc by the cylinder intake air amount calculation unit 21 based on the amount of intake air Qa.

The throttle opening degree learning unit 23 is provided with: the target intake air amount calculation part 201 that calculates the target amount of intake air Qa* based on the operating state of the engine 1; the target effective opening area calculation part 202 that calculates the target effective opening area CAt* which is regulated by the throttle 4, by applying the target amount of intake air Qa*, the intake manifold pressure Pb, the atmospheric air pressure PA and the atmospheric air temperature Ta to the flow rate calculation expression (i.e., the expression (9) and the expression (11)) of the throttle type flow meter; the actual effective opening area calculation part 206 (a learning effective opening area calculation unit) that calculates the actual effective opening area CAti (an effective opening area for learning) of the throttle 4, by applying the actual cylinder intake air amount Qc, the intake manifold pressure Pb, the atmospheric air pressure PA and the atmospheric air temperature Ta for carrying out the control of the engine 1 to the flow rate calculation expression of the throttle type flow meter; and the throttle opening degree learning value calculation part 209 that calculates the throttle opening degree learning value θLN for calculating the learning corrected target throttle opening degree θLN* (the throttle opening degree learning value), by learning the relation between the throttle opening degree θ and the effective opening area CAt in such a manner that the actual effective opening area CAti is made to coincide with the target effective opening area CAt*.

In this manner, in cases where the cylinder intake air amount is calculated by the use of an S/D method, at the time of steady state operation, the relation between the throttle opening degree and the effective opening area is learned, while calculating the cylinder intake air amount from a volumetric efficiency correction factor map which has been adapted by the valve timing at the time of steady state operation (conventional method), whereas in a period of time from a time point of a transient change until the temperature in an exhaust manifold is converged, the amount of intake air Qa having passed through the throttle 4 is calculated based on the relation between the throttle opening degree θ and the effective opening area CAt thus learned, and the cylinder intake air amount Qc is calculated based on the physical model (an arithmetic system which models a response delay of the intake system until the air having passed through the throttle valve comes into a cylinder) which is similar to an AFS method, whereby it is possible to estimate the cylinder intake air amount Qc to a sufficient degree of accuracy for controlling the engine 1 in a suitable manner by the use of the S/D method, in either of a steady state operation and a transient operation with a small number of adaptation constants and a small amount of calculation or computation load, without requiring a huge memory capacity.

That is, only at the time of steady state operation, the cylinder intake air amount Qc is calculated according to the same S/D method as the conventional one, and so, it is possible to adapt the estimation device to both of the steady state operation and the transient operation, by the use of only the map of the volumetric efficiency correction factor Kv which has been adapted to the valve timing at the time of the steady state operation. As a result, the number of adaptation man hours of the volumetric efficiency correction factor maps and the number of the maps can be reduced.

Moreover, the throttle opening degree learning value calculation part 209 according to the first embodiment of the present invention is provided with: the throttle opening degree learning basic value calculation part 208 that calculates the throttle opening degree learning basic value Δθ for making the actual effective opening area CAti and the target effective opening area CAt* coincident with each other; the real-time learning value calculation part 212 that calculates the real-time learning value θR from the throttle opening degree learning basic value Δθ; the long time learning value calculation part 213 that calculates the long time learning value θL from the throttle opening degree learning basic value Δθ; the long time learning value storage part 215 that stores the long time learning value θL; and the adder 216 that calculates the throttle opening degree learning value θLN by adding the long time learning value θL, which has been stored in the long time learning value storage part 215, and the real-time learning value θR to each other.

In addition, the throttle opening degree learning value calculation part 209 is also provided with the long time learning value monotonically increasing processing part 214 for ensuring the monotonically increasing state of the long time learning value θL, thus making it possible to prevent the erroneous learning or malfunction of the throttle opening degree learning value θLN.

Further, the physical model 25 according to the first embodiment of the present invention is provided with: a first physical model (step 106) that estimates the cylinder intake air amount Qc based on the amount of intake air Qa having passed through the throttle valve 4*a*; and a second physical model (step 107) that is composed of the inverse model 200 that is an inverse of the first physical model, and estimates the amount of intake air Qa having passed through the throttle valve 4*a* based on the cylinder intake air amount Qc.

At the time of steady state operation, the physical model 25 estimates a first amount of intake air Qa having passed through the throttle valve 4*a* by the use of the actual cylinder intake air amount Qc and the second physical model (step 107), and carries out opening degree learning based on the first amount of intake air Qa, and at the same time, estimates again the actual cylinder intake air amount Qc by the use of the first amount of intake air Qa and the first physical model (step 106).

In addition, at the time of transient operation, the physical model 25 estimates a second amount of intake air Qa having passed through the throttle valve 4*a*, by applying the actual effective opening area CAti, the intake manifold pressure Pb, the atmospheric air pressure PA and the atmospheric air temperature Ta to the flow rate calculation expression, and at the same time, estimates the actual cylinder intake air amount Qc by the use of the second amount of intake air Qa and the first physical model (step 106).

In this manner, at the time of the transient operation, by calculating the cylinder intake air amount Qc by the use of the physical model 25 which models a response delay of the intake system until the air having passed through the throttle valve 4*a* comes into a cylinder, and which is similar to the AFS method, it is possible to suppress an estimation error of the cylinder intake air amount Qc after a transient change.

In addition, the first physical model (step 106) according to the first embodiment of the present invention is provided with the intake manifold density calculation unit 24 that calculates a density in the intake pipe at the downstream side of the throttle valve 4*a* and an amount of change of the density for one stroke, as an intake manifold density ρb and an amount of change Δρb of the intake manifold density, respectively, wherein the first physical model calculates the cylinder intake air amount Qc by using the volumetric efficiency correction factor Kv and the amount of intake air Qa having passed through the throttle valve 4*a*.

Moreover, the volumetric efficiency correction factor calculation unit 22 calculates the volumetric efficiency correction factor Kv used in the first physical model (step 106) by the use of the amount of intake air Qa having passed through the throttle valve 4*a*, the intake manifold density ρb, and the amount of change Δρb of the intake manifold density.

In this manner, by calculating the volumetric efficiency correction factor Kv with the use of the amount of intake air Qa, the intake manifold density ρb, and the amount of change Δρb of the intake manifold density, it becomes possible to calculate the cylinder intake air amount Qc with a high degree of accuracy in real time.

Further, the variety of kinds of sensors according to the first embodiment of the present invention include the intake air temperature sensor 8 that detects a temperature in the intake pipe at the downstream side of the throttle valve 4*a* as an intake manifold temperature Tb, and the intake manifold density calculation unit 24 calculates the intake manifold density ρb and the amount of change Δρb of the intake manifold density by the use of the intake manifold pressure Pb and the intake manifold temperature Tb.

As a result of this, it is possible to calculate the intake manifold density ρb and the amount of change Δρb of the intake manifold density from the intake manifold pressure Pb and the intake manifold temperature Tb in an easy manner.

In addition, the volumetric efficiency correction factor calculation unit 22 according to the first embodiment of the present invention calculates the volumetric efficiency correction factor Kv(n) used in the first physical model (step 106) from the following expression (14) using the amount of intake air Qa [g] for one stroke of the engine 1, the intake manifold density ρb [g/cm$^3$], the amount of change Δρb [g/cm$^3$] of the intake manifold density, the intake pipe volume Vs [cm$^3$] from a downstream side of the throttle valve to a cylinder inlet port, and the cylinder stroke volume Vc [cm$^3$] per one cylinder of the internal combustion engine.

[Expression 14]

$$Kv = \frac{Qa - \Delta\rho_b \cdot Vs}{\rho_b \cdot Vc} \tag{14}$$

The expression (14) above corresponds to the above-mentioned expression (6), and is substantially the same as the expression (6).

According to this, the volumetric efficiency correction factor Kv can be estimated with a high degree of accuracy by a simple calculation operation based on a theory.

Moreover, the volumetric efficiency correction factor calculation unit 22 according to the first embodiment of the present invention calculates, as the volumetric efficiency corresponding value used in the first physical model (step 106), the filtered volumetric efficiency correction factor Kvf(n) which is obtained by further carrying out filtering processing with respect to the volumetric efficiency correction factor Kv calculated from the expression (14). As a result, it is possible to absorb minute detection errors included in the variety of kinds of sensors, so that the influence on the volumetric efficiency correction factor Kv due to such detection errors can be suppressed.

Further, until the opening degree learning at the time of steady state operation is completed, even at the time of transient operation, the physical model 25 according to the first embodiment of the present invention prohibits the estimation of the amount of intake air Qa having passed through the throttle valve 4*a*, and estimates the actual cylinder intake air amount Qc by the use of the intake manifold pressure Pb and the volumetric efficiency correction factor Kv, similarly at the time of steady state operation. As a result, even in cases where the throttle opening learning is not completed, the cylinder intake air amount Qc can be estimated with a degree of accuracy equivalent to that in the conventional S/D method.

Furthermore, the physical model 25 according to the first embodiment of the present invention is provided with an intake manifold pressure peak value calculation unit that detects an intake manifold pressure peak value for one stroke (between predetermined crank angles), wherein in cases where the intake manifold pressure peak value thus detected is larger than the atmospheric air pressure PA, even at the time of transient operation, the estimation of the amount of intake air Qa having passed through the throttle valve 4*a* is prohibited, and the actual cylinder intake air amount Qc is estimated by the use of the intake manifold pressure Pb and the volumetric efficiency correction factor Kv, similarly at the time of steady state operation. As a result, even if there occurs a stream of air which flows backwards through the throttle valve 4*a*, due to the vibration of the intake manifold pressure Pb at the time of transient operation, the deterioration of the estimation accuracy of the amount of intake air Qa resulting from the back flow air can be suppressed, thus making it possible to estimate the cylinder intake air amount Qc with a degree of accuracy equivalent to that in the conventional S/D method.

While the invention has been described in terms of a preferred embodiment, those skilled in the art will recognize that the invention can be practiced with modifications within the spirit and scope of the appended claims.

What is claimed is:

1. An estimation device for a cylinder intake air amount in an internal combustion engine, which serves for estimating a cylinder intake air amount sucked into a cylinder in the internal combustion engine which is connected to an intake pipe at a location downstream of a throttle valve, said estimation device comprising:

a variety of kinds of sensors that detect operating states of said internal combustion engine related to a variety of kinds of actuators; and a physical model that models a response delay of an intake system until the air having passed through said throttle valve comes into said cylinder, by using detected values of said variety of kinds of sensors as input information;

wherein said variety of kinds of actuators include a throttle opening degree control unit that regulates an amount of air passing through said throttle valve by controlling a throttle opening degree of said throttle valve thereby to change an effective opening area thereof;

wherein said variety of kinds of sensors include:

an atmospheric air temperature sensor that detects an atmospheric air temperature at an atmospheric air side of said throttle valve;

an atmospheric air pressure sensor that detects an atmospheric air pressure at the atmospheric air side of said throttle valve; and an intake manifold pressure sensor which detects a pressure in the intake pipe at a downstream side of said throttle valve as an intake manifold pressure;

wherein said physical model includes:

a volumetric efficiency corresponding value calculation unit that calculates a volumetric efficiency corresponding value which is an index indicating said cylinder intake air amount;

a throttle opening degree learning unit that calculates a learning corrected target throttle opening degree for achieving a target amount of intake air by learning a relation between said throttle opening degree and said effective opening area; and a cylinder intake air amount calculation unit that calculates said actual cylinder intake air amount;

wherein at the time of steady state operation, the estimation of said actual cylinder intake air amount by said cylinder intake air amount calculation unit is carried out by using said intake manifold pressure and said volumetric efficiency corresponding value, and at the same time, opening degree learning by said throttle opening degree learning unit is carried out based on said actual cylinder intake air amount, whereas at the time of steady state operation, after the opening degree learning by said throttle opening degree learning unit is stopped, an amount of intake air having passed through the throttle valve is estimated by applying the actual effective opening area calculated from said throttle opening degree and a result of said opening degree learning, said intake manifold pressure, said atmospheric air pressure and said atmospheric air temperature to a flow rate calculation expression of a throttle type flow meter, and at the same time, the calculation of said actual cylinder intake air amount by said cylinder intake air amount calculation unit is carried out based on said amount of intake air.

2. The estimation device for a cylinder intake air amount in an internal combustion engine, as set forth in claim 1, wherein said throttle opening degree learning unit is provided with:

a target intake air amount calculation unit that calculates said target amount of intake air based on an operating state of said internal combustion engine;

a target effective opening area calculation unit that calculates a target effective opening area which is regulated by said throttle opening degree control unit, by applying said target amount of intake air, said intake manifold pressure, said atmospheric air pressure and said atmospheric air temperature to the flow rate calculation expression of the throttle type flow meter;

a learning effective opening area calculation unit that calculates a learning effective opening area of said throttle opening degree control unit, by applying said actual cylinder intake air amount for carrying out control of said internal combustion engine, said intake manifold pressure, said atmospheric air pressure and said atmospheric air temperature to the flow rate calculation expression of said throttle type flow meter; and a throttle opening degree learning value calculation unit that calculates a throttle opening degree learning value for calculating said learning corrected target throttle opening degree, by learning the relation between said throttle opening degree and said effective opening area in such a manner that said learning effective opening area is made to coincide with said target effective opening area.

3. The estimation device for a cylinder intake air amount in an internal combustion engine, as set forth in claim 2, wherein said throttle opening degree learning value calculation unit is provided with:

a throttle opening degree learning basic value calculation unit that calculates a throttle opening degree learning basic value for making said learning effective opening area and said target effective opening area coincident with each other;

a real-time learning value calculation unit that calculates a real-time learning value from said throttle opening degree learning basic value;

a long time learning value calculation unit that calculates a long time learning value from said throttle opening degree learning basic value;

a long time learning value storage unit that stores said long time learning value; and an adder that calculates said throttle opening degree learning value by adding said long time learning value, which has been stored in said long time learning value storage unit, and said real-time learning value θR to each other.

4. The estimation device for a cylinder intake air amount in an internal combustion engine, as set forth in claim 3, wherein said throttle opening degree learning value calculation unit is provided with a long time learning value monotonically increasing processing unit for ensuring a monotonically increasing state of said long time learning value.

5. The estimation device for a cylinder intake air amount in an internal combustion engine, as set forth in claim 1, wherein said physical model includes:

a first physical model that estimates said cylinder intake air amount based on the amount of intake air having passed through said throttle valve; and a second physical model that is composed of an inverse model that is an inverse of said first physical model, and estimates the amount of intake air having passed through said throttle valve based on said cylinder intake air amount;

wherein at the time of said steady state operation, said physical model estimates a first amount of intake air having passed through said throttle valve by using said actual cylinder intake air amount and said second physical model, carries out said opening degree learning based on said first amount of intake air, and at the same time, estimates again said actual cylinder intake air amount by using said first amount of intake air and said first physical model; and wherein at the time of said transient operation, said physical model estimates a second amount of intake air having passed through said throttle valve, by applying said actual effective opening area, said intake manifold pressure, said atmospheric air pressure and said atmospheric air temperature to said flow rate calculation expression, and at the same time, estimates said actual cylinder intake air amount by using the second amount of intake air and said first physical model.

6. The estimation device for a cylinder intake air amount in an internal combustion engine, as set forth in claim 5, wherein said first physical model includes an intake manifold density calculation unit that calculates a density in the intake pipe at the downstream side of said throttle valve and an amount of change of the density for one stroke, as an intake manifold density and an amount of change of the intake manifold density, respectively;

wherein said first physical model calculates said cylinder intake air amount by using said volumetric efficiency corresponding value and the amount of intake air having passed through said throttle valve; and wherein said volumetric efficiency corresponding value calculation unit calculates said volumetric efficiency corresponding value used in said first physical model by using the amount of intake air having passed through said throttle valve, said intake manifold density, and said amount of change of the intake manifold density.

7. The estimation device for a cylinder intake air amount in an internal combustion engine, as set forth in claim 6, wherein said variety of kinds of sensors include an intake air temperature sensor that detects a temperature in the intake pipe at the downstream side of said throttle valve as an intake manifold temperature; and wherein said intake manifold density calculation unit calculates said intake manifold density and said amount of change of the intake manifold density by using said intake manifold pressure and said intake manifold temperature.

8. The estimation device for a cylinder intake air amount in an internal combustion engine, as set forth in claim 6, wherein said volumetric efficiency corresponding value calculation unit calculates said volumetric efficiency corresponding value Kv used in said first physical model from the following expression (1)

[Expression 1]

$$Kv = \frac{Qa - \Delta\rho_b \cdot Vs}{\rho_b \cdot Vc} \tag{1}$$

using the amount of intake air Qa [g] for one stroke of said internal combustion engine, said intake manifold density ρb [g/cm$^3$], said amount of change Δρb [g/cm$^3$] of the intake manifold density, an intake pipe volume Vs [cm$^3$] from the downstream side of said throttle valve to a cylinder inlet port, and a cylinder stroke volume Vc [cm$^3$] per one cylinder of said internal combustion engine.

9. The estimation device for a cylinder intake air amount in an internal combustion engine, as set forth in claim 8, wherein said volumetric efficiency corresponding value calculation unit calculates, as the volumetric efficiency corresponding value used in said first physical model, a filtered volumetric efficiency corresponding value which is obtained by further carrying out filtering processing with respect to the volumetric efficiency corresponding value calculated from said expression (1).

10. The estimation device for a cylinder intake air amount in an internal combustion engine, as set forth in claim 1, wherein until said opening degree learning at the time of said steady state operation is completed, even at the time of said transient operation, said physical model prohibits the estimation of the amount of intake air having passed through said throttle valve, and estimates said actual cylinder intake air amount by using said intake manifold pressure and said volumetric efficiency corresponding value, similarly at the time of said steady state operation.

11. The estimation device for a cylinder intake air amount in an internal combustion engine, as set forth in claim 1, wherein said physical model includes an intake manifold pressure peak value calculation unit that detects an intake manifold pressure peak value between predetermined crank angles; and wherein in cases where said intake manifold pressure peak value is larger than said atmospheric air pressure, even at the time of transient operation, said physical model prohibits the estimation of the amount of intake air having passed through said throttle valve, and estimates said actual cylinder intake air amount by using said intake manifold pressure and said volumetric efficiency corresponding value, similarly at the time of said steady state operation.

* * * * *